(12) United States Patent
Wang et al.

US012485882B1

(10) Patent No.: US 12,485,882 B1
(45) Date of Patent: Dec. 2, 2025

(54) COLLISION AVOIDANCE AND MITIGATION IN AUTONOMOUS VEHICLES USING PREDICTED TRAJECTORIES

(71) Applicant: Zoox, Inc., Foster City, CA (US)

(72) Inventors: Chuang Wang, Woodside, CA (US); Cooper Stokes Sloan, San Francisco, CA (US); Noureldin Ehab Hendy, Foster City, CA (US); William Harland Montgomery, IV, Burlingame, CA (US); Yi Xu, Pasadena, CA (US)

(73) Assignee: Zoox, Inc., Foster City, CA (US)

( * ) Notice: Subject to any disclaimer, the term of this patent is extended or adjusted under 35 U.S.C. 154(b) by 138 days.

(21) Appl. No.: 17/514,542

(22) Filed: Oct. 29, 2021

(51) Int. Cl.
*B60W 30/09* (2012.01)

(52) U.S. Cl.
CPC ....... *B60W 30/09* (2013.01); *B60W 2420/408* (2024.01); *B60W 2540/049* (2020.02); *B60W 2540/227* (2020.02); *B60W 2554/00* (2020.02); *B60W 2554/801* (2020.02); *B60W 2554/802* (2020.02)

(58) Field of Classification Search
CPC ........... B60W 30/09; B60W 2540/227; B60W 2540/049; B60W 2554/00; B60W 2554/802; B60W 2554/801; B60W 2540/52
See application file for complete search history.

(56) References Cited

U.S. PATENT DOCUMENTS

| | | | | |
|---|---|---|---|---|
| 2003/0139883 A1* | 7/2003 | Takafuji | ............... | G01P 15/00 |
| | | | | 340/436 |
| 2011/0295467 A1* | 12/2011 | Browne | ............... | G01S 13/87 |
| | | | | 701/46 |
| 2014/0379167 A1* | 12/2014 | Flehmig | ............... | G08G 1/16 |
| | | | | 701/1 |
| 2015/0239413 A1* | 8/2015 | Kozloski | ............ | B60R 21/0134 |
| | | | | 701/1 |
| 2018/0253973 A1* | 9/2018 | Yang | ............ | G06V 20/58 |
| 2019/0179002 A1* | 6/2019 | Takayama | ............ | G01S 13/726 |
| 2020/0005648 A1* | 1/2020 | Yang | ............ | G08G 1/166 |
| 2020/0086854 A1* | 3/2020 | Liu | ............ | B60W 30/0956 |
| 2020/0110416 A1* | 4/2020 | Hong | ............ | G05D 1/0088 |

(Continued)

*Primary Examiner* — Scott A Browne
*Assistant Examiner* — Rami Nabih Bedewi
(74) *Attorney, Agent, or Firm* — Lee & Hayes, P.C.

(57) ABSTRACT

A vehicle safety system of an autonomous vehicle may determine predicted velocity vectors for a potential collision, and use the velocity vectors to determine a trajectory for the autonomous vehicle to traverse the environment. The vehicle safety system may analyze sensor data to determine a likelihood of a potential collision with a dynamic object in the environment. Predicted velocity vectors may be determined for the autonomous vehicle and the dynamic object at a time and/or location associated with the potential collision. The predicted velocity vectors may be used to determine a point of impact, relative angle, and/or relative velocity between the autonomous vehicle and dynamic object at the potential collision. The likelihood of the potential collision and the predicted velocity vectors may be used to determine a trajectory for the autonomous vehicle, which may include following a current trajectory or transitioning to one or more contingent trajectories.

20 Claims, 9 Drawing Sheets

(56) References Cited

U.S. PATENT DOCUMENTS

| | | | | |
|---|---|---|---|---|
| 2020/0143675 A1* | 5/2020 | Chopra | ............... | H04W 4/46 |
| 2020/0174481 A1* | 6/2020 | Van Heukelom | .. | G01C 21/3407 |
| 2020/0189573 A1* | 6/2020 | King | ............... | B60R 21/0134 |
| 2020/0339116 A1* | 10/2020 | Xu | ............... | B60W 30/18145 |
| 2020/0400821 A1* | 12/2020 | Baker | ............... | G01S 7/4804 |
| 2021/0261159 A1* | 8/2021 | Pazhayampallil | .... | B60W 10/18 |
| 2023/0131632 A1* | 4/2023 | Hartnett | ............... | G06F 30/20 |
| | | | | 703/8 |
| 2023/0391320 A1* | 12/2023 | Mita | ............... | G08G 1/163 |

* cited by examiner

COLLISION AVOIDANCE AND MITIGATION IN AUTONOMOUS VEHICLES USING PREDICTED TRAJECTORIES

BACKGROUND

Safety of passengers in a vehicle and other people or objects in proximity to the vehicle are of the upmost importance. Such safety is often predicated on an accurate detection of a potential collision and timely deployment of a safety measure. To safely operate, an autonomous vehicle may include multiple sensors and various systems for detecting and tracking events surrounding the autonomous vehicle and may take these events into account when controlling the autonomous vehicle. For example, the autonomous vehicle may detect and track every object within a 360-degree view of a set of cameras, LIDAR sensors, radar, and/or the like to control the autonomous vehicle safely.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
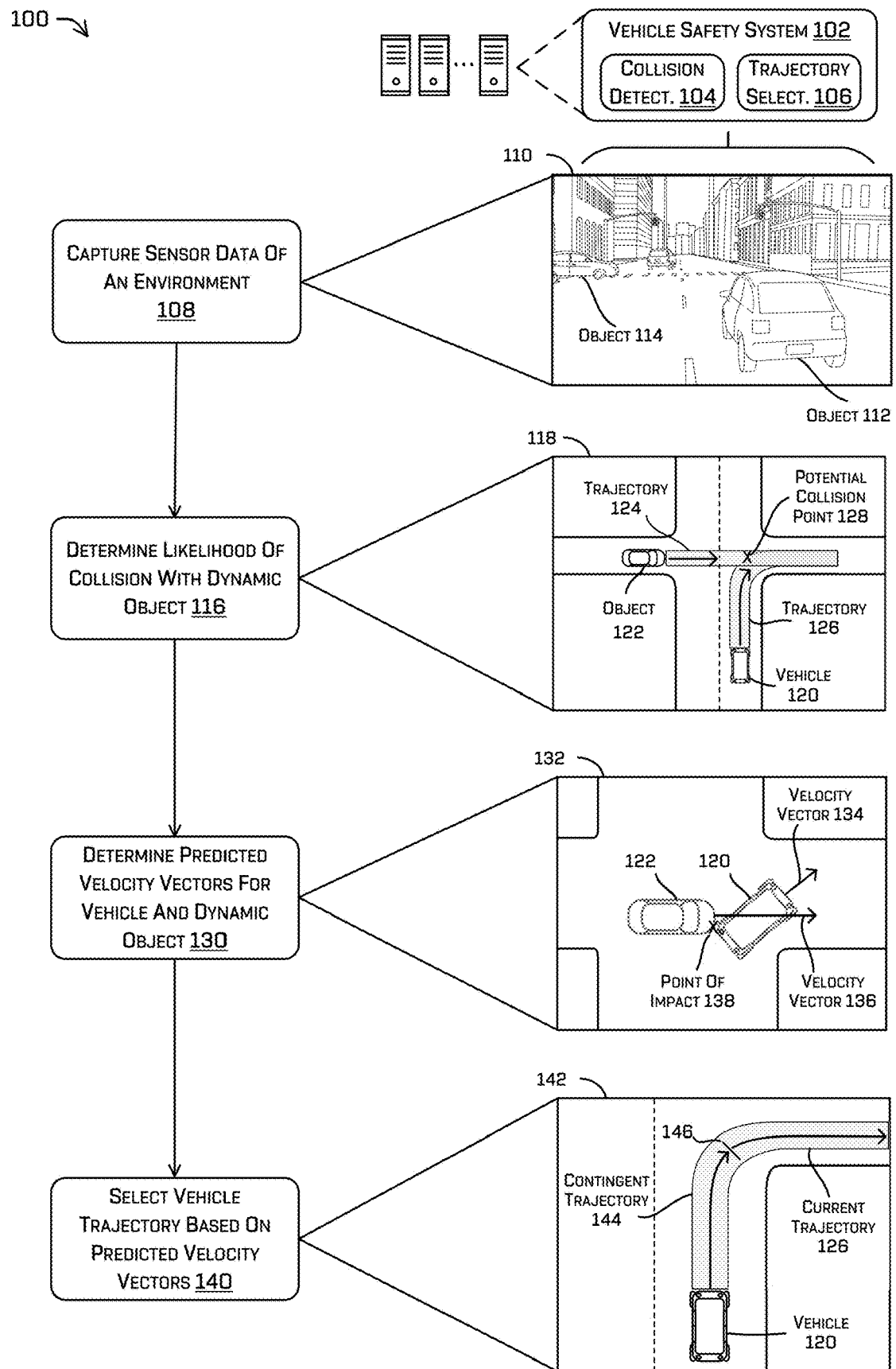
FIG. 1 illustrates an example technique of determining a trajectory for an autonomous vehicle within a driving environment, based on a likelihood of a potential collision with a dynamic object and the predicted velocity vectors of the autonomous vehicle and the dynamic object, in accordance with one or more implementations of the disclosure.

Various techniques described herein relate to determining a likelihood of a potential collision for an autonomous vehicle in an environment, and determining and executing a vehicle safety maneuver by the autonomous vehicle based on detecting the potential collision. In some examples, a vehicle safety system of an autonomous vehicle may receive and analyze sensor data to determine a potential collision between the autonomous vehicle and a dynamic object within the environment (e.g., an object capable of movement). Based on determining the potential collision, the vehicle safety system may determine predicted velocity vectors for the autonomous vehicle and the dynamic object associated with the potential collision. The predicted velocity vectors may be compared or analyzed to determine various characteristics of the potential collision, such as the relative angle and relative velocity between the autonomous vehicle and dynamic object, and/or the point of impact of the potential collision on the autonomous vehicle. Using the likelihood of the potential collision, the predicted velocity vectors and/or potential collision characteristics, the vehicle safety system may determine a vehicle safety maneuver (e.g., a trajectory) for the autonomous vehicle to use to traverse the environment. In some examples, a trajectory selected for the autonomous vehicle may include following the current vehicle trajectory, or transitioning to one or more contingent trajectories generated by vehicle safety system based on the detection of the potential collision and one or more characteristics associated with the potential collision.

When traversing a driving environment, an autonomous vehicle may use various sensors to capture sensor data within the environment (e.g., image data, radar data, lidar data, sonar data, etc.), and to identify various objects within the environment. The objects encountered within an environment can include dynamic objects that are moving or capable of movement (e.g., vehicles, motorcycles, bicycles, pedestrians, animals, etc.), and/or static objects (e.g., buildings, road surfaces, trees, signs, barriers, parked vehicles, etc.). The autonomous vehicle also may include various components configured to determine information about the objects detected in the environment, such as components to identify the objects, determine bounding boxes, perform instance and semantic segmentation, object classification, and the like. For dynamic objects detected within the environment, the autonomous vehicle also may include components to perform object tracking and to generate one or more predicted trajectories for the objects. In some cases, an autonomous vehicle may generate a single predicted trajectory for a dynamic object based on object type, location, pose, velocity, etc. Additionally or alternatively, an autonomous vehicle may generate multiple possible trajectories for a dynamic object, with confidence scores associated with any number of possible trajectories (including all).

Autonomous vehicle systems also may include one or more components to generate trajectories for the autonomous vehicle, based on the destination of the vehicle, road data, and the objects detected in the environment. One or more vehicle trajectories may be generated by the planning component, that the vehicle may follow to safely and legally traverse the environment, while avoiding any possible interactions (e.g., collisions or near-miss collisions) with the other objects in environment.

In some examples, an autonomous vehicle may include a vehicle safety system (e.g., a collision avoidance system) to predict potential collisions that may occur between the autonomous vehicle and other objects in the environment, and to control the autonomous vehicle in response to the potential collisions. For vehicle safety systems to be effective in avoiding or mitigating potential collisions, such systems may be designed to operate quickly both in detecting potential collisions and in controlling the vehicle when a potential collision is detected. In some cases, vehicle safety systems may be implemented using a secondary computing infrastructure on the autonomous vehicle that is separate from the primary computing infrastructure used for perception, prediction, trajectory planning, etc. In this manner, performance of the safety systems are not impacted by failures or heavy processing loads associated with the primary computing infrastructure. Such implementations may provide additional technical advantages based on the independence of the vehicle safety system, both in terms of computational output and performance, from the primary vehicle navigation systems, which can provide redundancy, error checking, and/or validation of the primary vehicle systems.

In order to provide greater speed and responsiveness, some vehicle safety systems may be configured to repeatedly generate and validate one or more alternative (or contingent) trajectories as the autonomous vehicle traverses the environment, before any potential collision is detected. Then, when a potential collision is detected, the vehicle safety system may immediately switch to a validated contingent trajectory, without needing to analyze the environment, execute perception models, or generate/validate an alternative trajectory on the fly. In some cases, the contingent trajectories that are pre-generated and pre-validated by the vehicle safety system may be straight-line braking trajectories designed to bring the vehicle to a stop as quickly and safely as possible. In other cases, contingent trajectories may include steering trajectories designed to pull the vehicle off of the road and out of traffic, or combinations of braking and steering trajectories, etc.

However, the contingent trajectories that are pre-generated and pre-validated by the vehicle safety system might not be desirable as contingent trajectories in all cases. For instance, when the vehicle safety system detects that a dynamic object is likely to rear-end the autonomous vehicle, then switching to a contingent braking trajectory by the autonomous vehicle might only increase the likelihood and severity of the potential collision. In this example, a more desirable option for the autonomous vehicle might be to maintain a straightforward driving trajectory, or to switch to a different contingent trajectory that does not involve braking.

To address these problems associated with vehicle safety systems, the techniques described herein may include analyzing the velocity vectors associated with a potential collision and determining a trajectory for the autonomous vehicle to follow based at least in part on the velocity vectors. In some examples, a vehicle safety system may determine predicted velocity vectors (e.g., speeds and directions of travel) for the autonomous vehicle and for the dynamic object with which a potential collision is predicted. The predicted velocity vectors for the autonomous vehicle and a dynamic object may be determined for one or more future times and/or locations at which the potential collision may occur. The vehicle safety system may compare and/or analyze the predicted velocity vectors to determine a possible point of impact on the autonomous vehicle, a predicted relative speed, and/or a predicted relative angle of impact between the autonomous vehicle and the dynamic object for the potential collision. Based on these and other characteristics of the potential collision, the vehicle safety system may determine a trajectory in order to reduce the likelihood and/or severity of a potential collision. For example, in response to detecting a potential rear-impact collision by another vehicle behind the autonomous vehicle, the vehicle safety system may analyze the velocity vectors of the potential collision and determine that the autonomous vehicle should remain on its current forward-driving trajectory. In contrast, in response to detecting a potential front-impact collision with another vehicle, the vehicle safety system may analyze the velocity vectors and determine that the autonomous vehicle should switch to a contingent braking trajectory.

The techniques described herein may be implemented within a collision detection component and/or trajectory selection component within a vehicle safety system. In some examples, the trajectory selection component may operate as a filter that determines when to prevent the vehicle safety system from switching to the contingent trajectory in response to detecting a certain type of potential collision (and, in some cases, modifies a trajectory or determines an alternate trajectory). In these examples, the trajectory selection component may determine that either the current trajectory or the contingent (e.g., braking and/or steering) trajectory should be followed, based on the comparison of the velocity vectors, the likelihood of the collision, and/or other characteristics of the potential collision, and then may cause the autonomous vehicle to follow the selected trajectory. Such examples may improve vehicle and passenger safety, while also maintaining the speed and responsiveness of the vehicle safety system, and the independence of the vehicle safety system from the primary vehicle navigation systems.

As noted above, the vehicle safety system may be implemented on a computing infrastructure within the autonomous vehicle that is separate and independent from the primary computing infrastructure used for perception, prediction, trajectory planning, etc. For instance, in some cases the vehicle safety system may implement one or more trained machine-learning (ML) models configured to detect potential collisions. In some examples, the vehicle safety system may include a single ML model trained to perform the combined functionality of one or more of a perception component, prediction component and/or planning component. Rather than a multi-stage sequential pipeline of hardware and/or software components, in such examples the vehicle safety system may include a single stage trained ML that is configured to receive raw sensor data and output a potential collision. In such examples, the vehicle safety system may provide further technical advantages of potential collision detection at higher speeds and lower latency, allowing the autonomous vehicle to detect and respond to potential collisions more quickly. Additional examples of techniques for generating and using trained machine-learned models to detect potential collisions can be found, for example, in U.S. patent application Ser. No. 16/591,518, entitled "Collision Avoidance Perception System" filed Oct. 2, 2019, the entirety of which is incorporated herein by reference for all purposes.

In certain examples, the trajectory selection component also may analyze and actively determine (e.g., select) between the current trajectory and one or more possible contingent trajectories generated by the vehicle safety system. For instance, when an autonomous vehicle is following a normal driving trajectory (e.g., generated by planning component) and the vehicle safety system has generated multiple different contingent trajectories, then, in response to detecting a potential collision the vehicle safety system may analyze and determine between the normal driving trajectory and any of the contingent trajectories. In some cases, the vehicle safety system may analyze any one or more of the possible trajectories of the autonomous vehicle (e.g., the current trajectory and validated contingent trajectories) and may determine different velocity vectors for the potential collision associated with any number of the possible trajectories. The vehicle safety system may compare the alternative sets of velocity vectors to the velocity vector of the dynamic object to determine different collision probabilities, points of impact, relative collision speeds and/or relative collision angles associated with any number of the possible trajectories of the autonomous vehicle. The vehicle safety system may then determine and execute the trajectory that minimizes the likelihood and/or severity of the potential collision.

Additionally or alternatively, vehicle safety system may generate different contingent trajectories associated with different types of potential collisions. For instance, the vehicle safety system may compute a first contingent trajectory for front-impact collisions, a second contingent trajectory for rear-impact collisions, a third contingent trajectory for side-impact collisions within a predetermine range of relative velocities and/or angles, and so on. In such cases, the multiple contingent trajectories may be pre-generated and/or pre-validated by the vehicle safety system, at predetermined periodic times, prior to the detection of any potential collision. Then, when a potential collision is detected by the vehicle safety system, the appropriate pre-validated contingent trajectory may be selected based on the velocity vectors and/or other characteristics of the potential collision (e.g., point of impact, relative or absolute vehicle speeds or angles, etc.)

In addition to using the velocity vectors of the autonomous vehicle and dynamic object to determine the characteristics of the potential collision (e.g., point of impact, relative or absolute vehicle speeds or angles, etc.), the vehicle safety system also may take into account various other characteristics of a potential collision when determining a trajectory or other vehicle safety maneuver in response to a detection of a potential collision. For instance, responsive to detecting a potential collision, the vehicle safety system may determine a vehicle safety maneuver (e.g., a trajectory from multiple different pre-generated and pre-validated trajectories), based on the likelihood (e.g., probability) of the potential collision, the current road conditions, current traffic conditions, current weather conditions, predicted trajectories generated from a primary compute unit, etc. Other potential collision characteristics that the vehicle safety system may use to determine a trajectory may include the object classification (e.g., object type) of the dynamic object, the speeds of the autonomous vehicle and/or dynamic object, the number of passengers being transported by the autonomous vehicle, and/or the positions of the passenger within the autonomous vehicle.

In still other examples, the vehicle safety system may detect and use inconsistencies between observed sensor data and map data to determine trajectory to follow responsive to detecting a potential collision. For example, the vehicle safety system may determine an inconsistency between the expected location of a traffic control annotation based on map data, and the observed location of the same traffic control annotation based on the sensor data captured by the autonomous vehicle. If the inconsistencies between the map data and observed sensor data for one or more such traffic control annotations meets or exceeds a threshold value, the vehicle safety system may take the inconsistencies into account for the trajectory selection. Additional examples of techniques for validating observed sensor data and/or validating the operation of vehicle systems based on map data can be found, for example, in U.S. patent application Ser. No. 17/491,009, entitled "Vehicle Systems" filed Sep. 30, 2021, the entirety of which is incorporated herein by reference for all purposes.

As shown in these and various other examples, these techniques described herein may improve the operation and functioning of autonomous or semi-autonomous vehicles, by selecting trajectories to more effectively avoid and/or mitigate potential collisions with other moving objects in the environment. For example, systems that automatically execute a predetermined contingent trajectory, such as an immediate braking trajectory, without taking into account the nature of a predicted collision, may increase the likelihood and/or severity of certain types of collisions in some cases. In contrast to such systems, the techniques described herein may take into account one or more characteristics of a predicted collision (e.g., trajectory of an object with which the collision is predicted relative to trajectory of the autonomous vehicle, predicted location and/or angle of impact, etc.) when determining an action to take to mitigate the collision. For instance, the techniques described herein may compare and/or analyze the velocity vectors associated with the objects for which a potential collision is predicted, and may determine a trajectory for the autonomous vehicle based on the velocity vectors. The selected trajectory may be the current trajectory generated by the planning component, or a contingent trajectory generated by the vehicle safety system. Further, because the current trajectory and contingent trajectories may be pre-generated and pre-validated, the vehicle safety system may quickly determine the trajectory and immediately switch to the selected trajectory after detecting a potential collision, without additional time delays caused by analyzing the driving environment, executing new perception models, and/or generating or validating new trajectories on the fly after the potential collision has been detected. Thus, using the techniques described herein, the vehicle safety system may provide improved trajectory selection for the autonomous vehicle to follow in response to detecting a potential collision, while also operating as quickly and effectively as possible, thereby improving the reaction time and the collision avoidance or mitigation techniques performed by the autonomous vehicle.

FIG. 1 is a pictorial flow diagram of an example process 100 for determining a trajectory for a vehicle in a driving environment, based on the detection of a potential collision with a dynamic object and the predicted velocity vectors of the autonomous vehicle and the dynamic object. As shown in this example, some or all of the operations in process 100 may be performed by a vehicle safety system 102 of an autonomous vehicle, including a collision detection component 104 and a trajectory selection component 106. In such examples, a primary compute unit may be used in conjunction with the vehicle safety system 102 to ingest sensor data and determine therefrom vehicle controls based on environmental observations and, in some examples, object detections, object trajectory predictions, and the like.

At operation 108, the autonomous vehicle may capture sensor data of an environment. In some examples, the sensor data can be captured by one or more sensors on a vehicle (autonomous or otherwise). For example, the sensor data can include data captured by one or more of a lidar sensor, a radar sensor, an image sensor, a time-of-flight sensor, a sonar sensor, and the like. The example image 110 driving depicts image data that may be captured by the sensors of the vehicle in operation 108. As shown in this example, the image 110 includes a representation of a first object 112 and a second object 114 in the environment. In this example, the first object 112 and the second object 114 are vehicles, but in other examples the objects detected within the environment may include pedestrians, bicycles, animals, and any other static or dynamic objects.

In some examples, the identification of the objects in operation 108 may include identifying/detecting the objects based on the sensor data, performing instance and/or semantic segmentation to define the boundaries of the objects, determining bounding boxes associated with the objects, classifying the objects and determining various object attributes (e.g., position, size, pose, velocity, etc.). The various functionality to identify, classify, and analyze objects in operation 108 may be performed by a perception component of the autonomous vehicle, which may include various trained models (e.g., convolutional neural networks (CNNs)) and/or other components configured to perform computer vision techniques. The functionality of operation 108 may or may not be incorporated into the vehicle safety system 102. For instance, in some cases a primary navigation system of the autonomous vehicle may include a perception component configured to process sensor data and perform object segmentation, and/or classification, while the vehicle safety system 102 may be incorporated into a separate secondary computing infrastructure of the autonomous vehicle.

At operation 116, the vehicle safety system 102 may determine a likelihood (or probability) of a potential collision with another dynamic object in the environment. To determine that the autonomous vehicle may be involved in a potential collision, the collision detection component 104 may determine a trajectory (or multiple potential trajectories) for any number of the dynamic objects in the environment. The collision detection component 104 then may compare the potential object trajectories to the current trajectory of the autonomous vehicle, and determine any time-space overlap in the trajectories which may represent a potential collision zone.

Box 118 depicts a top-down representation of a driving environment, including a vehicle 120 (e.g., an autonomous vehicle including the vehicle safety system 102) and an object 122 (e.g., object 114). As shown in this example, the vehicle safety system 102 may determine a potential trajectory 124 for the object 122, and compare the object trajectory 124 to the trajectory 126 of the vehicle 120. As used herein, a trajectory for a vehicle or other object may refer to a path that the vehicle/object may take through the environment during a future time period. Trajectories may be represented as sequences of locations and corresponding future points in time ($t_1$, $t_2$, $t_3$, etc.) after the current time. In some examples, trajectories may include additional information, such as state data for the vehicle or object (e.g., velocity, acceleration, orientation angle, pose, vehicle controls (such as torques to be applied), etc.) for the future points in time in a trajectory. With respect to the autonomous vehicle (e.g., vehicle 120), the trajectory 126 may be a current trajectory determined by the planning component of the vehicle 120 based on an intended route or destination (e.g., the planner trajectory). The planning component of the vehicle 120 may actively implement by the planner trajectory 126 by transmitting commands to the drive system components of the vehicle 120. In contrast, the trajectory 124 of the object 122 may be determined by a prediction component of the vehicle 120 based on the captured sensor data associated with the object 122. The trajectory 124 may represent a continuation the current observed trajectory of the object 122 (e.g., assuming the current velocity or acceleration, current steering rate, etc.) and/or most likely future trajectory of the object 122 (e.g., taking into account street or traffic features, other objects in the environment, etc.).

The vehicle safety system 102 may determine a single potential trajectory for the object 122 or may determine multiple possible trajectories for the object 122, any number of which may have an associated probability value representing the likelihood of the object 122 following that particular trajectory. As shown in this example, a single trajectory 124 has been determined for the object 122, which intersects with the current trajectory 126 of the vehicle 120 at the potential collision point 128.

In various examples, a number of different techniques may be used to determine the object trajectory 124 and/or the likelihood of an intersection between the object trajectory 124 and the vehicle trajectory 126 representing a potential collision. In some cases, to determine the likelihood of a potential collision based on the trajectories, the vehicle safety system 102 may determine projected regions, including bounding boxes, path polygons (or corridors), etc. for the vehicle and the object based on the trajectories to determine if a time-space overlap occurs between the vehicle 120 and the object 122 following their respective trajectories. The intersection between trajectory 124 and trajectory 126 may represent a potential collision, and the vehicle safety system 102 may analyze the overlap detected between regions (e.g., bounding boxes or corridors) at different time intervals based on the vehicle and object trajectories to determine a likelihood of a potential collision between the vehicle and any number of the perturbed trajectories of the object. Additional examples of techniques to control a vehicle and avoid collisions between the vehicle and other moving objects in an environment can be found, for example, in U.S. patent application Ser. No. 16/136,038, entitled "Collision Prediction and Avoidance for Vehicles" filed Sep. 19, 2018, the entirety of which is incorporated herein by reference for all purposes.

In other examples, probability distributions associated with future object locations in the environment may be discretized to generate probability distributions for the vehicle 120 and/or the object 122 at different future points in time. For instance, one or more machine learning models may be trained to output a heat map of prediction probabilities representing possible locations of the object at a future time, and probability maps for individual objects may be aggregated to generate aggregated probability maps. Further details and additional examples of techniques to determine probabilities associated with potential collisions between moving objects in an environment can be found, for example, in U.S. patent application Ser. No. 16/206,877, entitled "Probabilistic Risk Assessment for Trajectory Evaluation," filed Nov. 30, 2018, the entirety of which is incorporated herein by reference for all purposes.

In still other examples, the vehicle safety system 102 may include machine learned models trained to output occupancy maps for the vehicle 120 and/or the object 122. The occupancy maps may represent predictions of whether at least a portion of an environment is occupied at a future time by any one of multiple object types. Further details and additional examples of techniques to create and use occupancy maps to validate, reject, or replace the trajectories can be found, for example, in U.S. patent application Ser. No. 16/848,834, entitled "Collision Avoidance Perception System," filed Apr. 14, 2020, the entirety of which is incorporated herein by reference for all purposes.

When using any of these examples and/or various other techniques to determine potential collisions, the collision detection component 104 may determine whether the vehicle trajectory 126 is projected to intersect with a predicted object trajectory 124 at a future point in time, or if the predicted object trajectory 124 is projected to pass within a predefined distance (e.g., a safety buffer) of vehicle 120 at a future time. In such cases, the collision detection component 104 may determine that a potential collision is likely (e.g., a probability of the potential collision meets or exceeds a probability threshold). In some cases, the vehicle safety system 102 might be configured to perform periodic checks (e.g., every 0.1 seconds, 0.2 seconds, . . . , 0.5 seconds, etc.) for potential collisions that are projected to occur within a relatively short time period (e.g., within the next 2 secs, 3 secs, 4 secs, 5 secs, etc.). In such cases, any potential collisions detected beyond that time period may be outside the scope of the vehicle safety system 102, and instead may be addressed through the normal operation of the planning component of the vehicle 120.

At operation 130, the vehicle safety system 102 may determine velocity vectors associated with the vehicle 120 and the object 122 for the potential collision. In some examples, a velocity vector may be a vector storing both a speed and directionality component for a dynamic object (e.g., vehicle 120 or object 122) at a particular point in time. Although various examples described herein refer to using velocity vectors for the vehicles and/or objects associated with a potential collision, it can be understood that acceleration vectors may be used additionally or alternatively with velocity vectors. Further, in some examples, the velocity vector may include additional data components such as the pose of the object, the angular velocity and/or angular acceleration of the object, etc.

Box 132 depicts another top-down representation of a driving environment. In this example, the driving environment may represent the same driving environment shown in box 118 at a potential future time of a collision between the autonomous vehicle 120 and the object 122. The velocity vector 134 represents the direction of travel and speed of the autonomous vehicle 120, and the velocity vector 136 represents the direction of travel and speed of the dynamic object 122. Point of impact 138 represents a predicted point of impact of the collision on the exterior surface of the autonomous vehicle 120.

The velocity vectors 134 and 136 may be determined by the trajectory selection component 106 and/or other components within the vehicle safety system 102. In some examples, these velocity vectors may be determined concurrently with or prior to determining the likelihood of a potential collision between the autonomous vehicle 120 and the dynamic object 122. For instance, velocity vectors 134 and 136 may be determined within the normal operation of the planning component controlling the autonomous vehicle 120 and the perception and prediction components detecting and analyzing the movement of dynamic object 122. Additionally or alternatively, the velocity vectors 134 and 136 may be determined after and/or in response to determining that a potential collision is likely between the autonomous vehicle 120 and the dynamic object 122.

In this example, the velocity vectors 134 and 136 are shown as predicted velocity vectors at the future time of the potential collision. In such cases, the vehicle safety system may use the trajectories determined for the autonomous vehicle 120 and the dynamic object 122 to predict the future speeds and the future orientations/directions of travel of the autonomous vehicle 120 and the dynamic object 122, at the time and/or location of the predicted potential collision. However, in other examples the velocity vectors need not be predicted future velocity vectors. Instead, in operation 130 the vehicle safety system 102 may receive the velocity vectors corresponding a current time, for instance, the time when the vehicle safety system 102 determined the likelihood of the potential collision (e.g., at the time depicted in box 118).

At operation 140, the vehicle safety system 102 may determine (and execute) a trajectory for the autonomous vehicle 120, based on the velocity vectors 134 and 136 determined for the autonomous vehicle 120 and the dynamic object 122. In various implementations, the trajectory selection component 106 may use the velocity vectors 134 and 136 in various different ways in determine the trajectory for the autonomous vehicle 120, responsive to detecting the potential collision.

Box 142 depicts another top-down representation of a driving environment. In this example, the driving environment may represent the same driving environment shown in box 118. For the autonomous vehicle 120, two possible trajectories are depicted for time when a potential collision has been detected but has not occurred. The two possible trajectories included the current (e.g., planner) trajectory 126 being followed by the autonomous vehicle 120, and a contingent trajectory 144 generated by the vehicle safety system 102 to bring the autonomous vehicle 120 to a rapid stop at point 146. In this example, the trajectory selection component 106 may determine between the current trajectory 126 and the contingent trajectory 144, based on the velocity vectors 134 and 136, the predicted point of impact, and/or other characteristics of the potential collision.

To determine a trajectory the autonomous vehicle 120 to follow, the trajectory selection component 106 may determine a predicted relative velocity and/or predicted relative angle of impact for the potential collision, based on the velocity vectors for the autonomous vehicle and dynamic object. In some cases, the trajectory selection component 106 may use mappings between trajectory determinations and predicted relative velocities and/or angles of impact, to determine a trajectory for the autonomous vehicle 120. As an example, when the relative velocity and relative angle of impact for a potential collision indicate that the autonomous vehicle 120 is traveling faster than the dynamic object 122 and is predicted to impact the dynamic object 122 from the front, side, or rear, then the trajectory selection component 106 may use mappings to determine a contingent trajectory (e.g., a braking trajectory) generated by the vehicle safety system 102 to attempt to avoid or mitigate the potential collision. In other examples, when the relative velocity and angle of impact indicate that the dynamic object 122 is moving faster and is predicted to impact the autonomous vehicle 120 from behind, then the trajectory selection component 106 may use mappings to determine that the contingent trajectory (e.g., a braking trajectory) should not be selected and instead the autonomous vehicle should proceed along its current (e.g., planner) trajectory. In these examples, the trajectory selection component 106 may use the mappings of relative velocities and relative angles of impact to determine whether the autonomous vehicle 120 is to remain on its current trajectory or to switch to a contingent trajectory.

The trajectory selection component 106 also may use ML models or other techniques, additionally or alternatively to mappings, to determine the trajectory for the autonomous vehicle 120 in operation 140. For instance, a trained model may receive as input the relative velocity and relative angle of impact between the autonomous vehicle 120 and dynamic object 122 in a potential collision, and may output a trajectory determination.

In some examples, the trajectory selection component 106 also may use the predicted point of impact 138 on the autonomous vehicle 120 to determine the trajectory determination in operation 140. For instance, the predicted point of impact 138 may be used in conjunction with the relative velocity and relative angle of impact, as input to mappings, trained models, and/or other trajectory determination techniques. As an example, a prediction of a glancing impact on one corner of the autonomous vehicle 120 may be mapped (or trained) to output a trajectory (e.g., a contingent braking trajectory), whereas a prediction of a glancing impact on the other corner of the autonomous vehicle 120 may be mapped (or trained) to output to a different trajectory (e.g., a contingent steering trajectory, a continuation of the planner trajectory, etc.).

Figure 2:
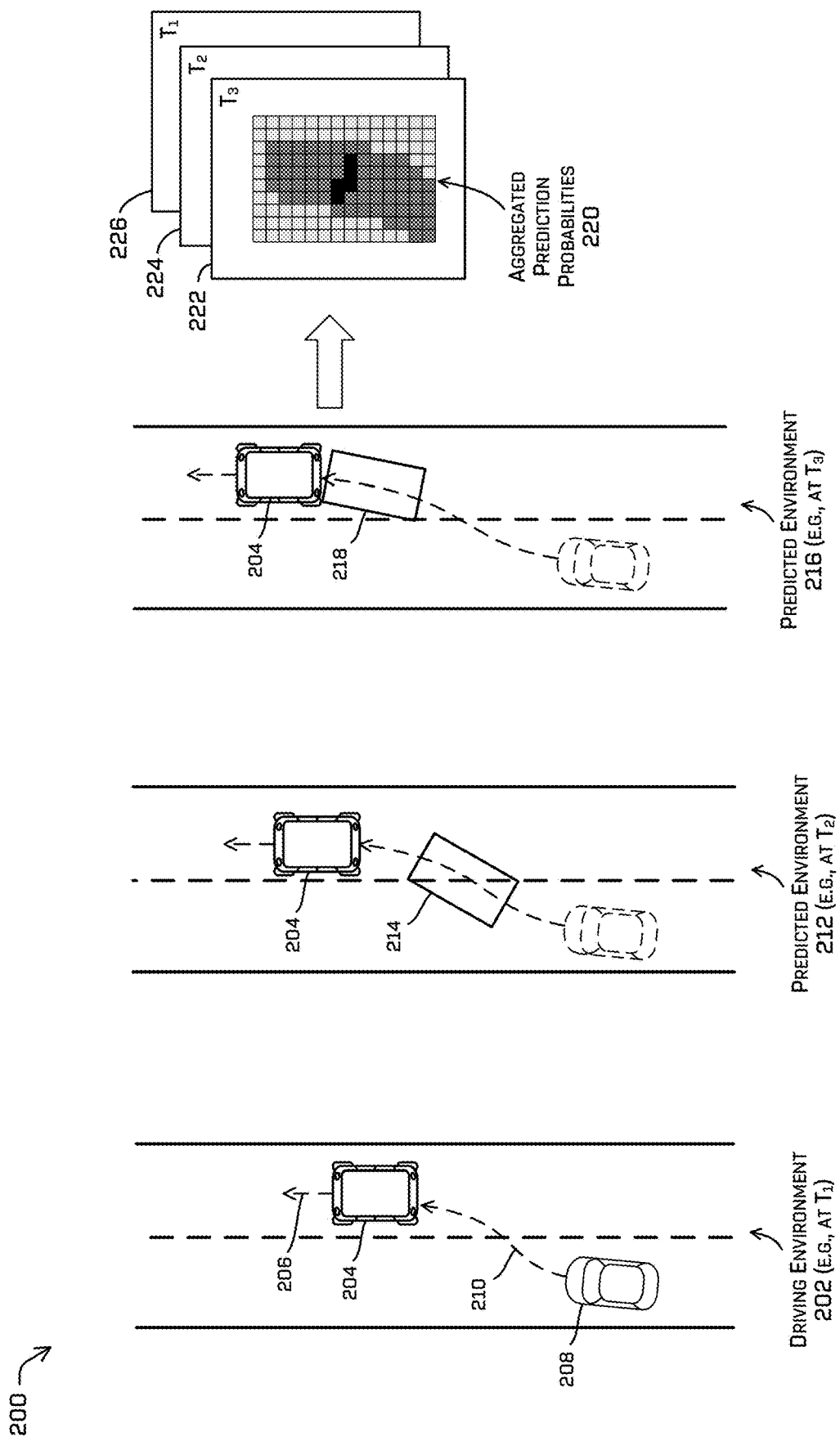
FIG. 2 illustrates a prediction of a potential collision between an autonomous vehicle and a dynamic object in a driving environment, in accordance with one or more implementations of the disclosure.

FIG. 2 shows a diagram 200 illustrating example techniques for evaluating the trajectories of an autonomous vehicle and a dynamic object within an environment, and determining a prediction of a potential collision. In this example, a driving environment 202 includes an autonomous vehicle 204 and a dynamic object 208. Although the dynamic object 208 is another vehicle in this case, in other examples, the dynamic object 208 may include any object capable of movement (e.g., a motorcycle, bicycle, pedestrian, animal, etc.).

As shown in this example, the driving environment 202 may represent the environment at an initial time (e.g., $T_1$). In this example, at the initial time a route planning component of the vehicle 204 may be implementing a trajectory 206 for traversing through the driving environment 202, based on an intended route or destination of the vehicle 204. While traversing the driving environment 202, the perception and/or prediction components of the vehicle 204 may detect and determine a trajectory 210 for the dynamic object 208. In this example, the dynamic object 208 has begun to initiate a lane change at the initial time in the driving environment 202. For instance, the dynamic object 208 may be changing lanes to pass another vehicle or to avoid an obstruction in the road. Accordingly, both the vehicle 204 and the dynamic object 208 are moving forward within the driving environment 202. However, as shown by the respective lengths of the trajectory 206 and the trajectory 210, the dynamic object 208 is moving faster than the dynamic object 208 at the initial time.

As noted above, the autonomous vehicle may include one or more navigation components (e.g., perception, prediction, and/or planning components) configured to detect, identify, classify, and track objects within the environment. A prediction component within the vehicle safety system, or within a separate and independent vehicle navigation system, may analyze the sensor data to determine the predicted trajectory 210 for the dynamic object 208. To detect a dynamic object 208 and/or determine a predicted trajectory 210, the vehicle safety system may use a combination of different sensor modalities, including image data, lidar data, radar data, sonar data, etc. In some examples, the vehicle safety system generate multiple renderings of a lidar point cloud representation of an environment. For instance, a first rendering of a lidar point cloud including the dynamic object 208 may be generated at a first resolution, and a second rendering of the same lidar point cloud may be generated at a second different resolution. The object detection, trajectory determination, and/or determination of predicted velocity vectors may be based on the first lidar point cloud rendering at the first resolution and the second lidar point cloud at the second resolution. Further details and additional examples of techniques to generating and using multiresolution sensor spaces can be found, for example, in U.S. patent application Ser. No. 16/420,090, entitled "Multiresolution Voxel Space," filed May 22, 2019, the entirety of which is incorporated herein by reference for all purposes.

A predicted environment 212 illustrates the vehicle 204 and the dynamic object 208 at a future time (e.g., at $T_2$, a time after $T_1$). As shown in this example, the vehicle 204 has determined a predicted location 214 of the dynamic object 208 in the predicted environment 212 at $T_2$. In some cases, the prediction component of the vehicle 204 may determine location prediction probabilities, represented as a Gaussian distribution of probabilities associated with possible locations of the dynamic object 208 within the predicted future environment 212. For instance, the location prediction probabilities may represent a one-dimensional Gaussian distribution (e.g., along a centerline of a road), a two-dimensional Gaussian distribution (e.g., representing an area of a drivable surface), and the like. In some instances, a predicted location 214 and/or prediction probabilities may correspond to a bounding box or a grid in a top-down view of the predicted environment 212. In some examples, the predicted location 214 can be based at least in part on a classification (e.g., object type) and/or shape of the dynamic object 208. For example, the predicted location and/or prediction probabilities associated with a compact car may be smaller relative to the predicted location and/or prediction probabilities associated with a bus.

Further, a second predicted future environment 216 illustrates the vehicle 204 and the dynamic object 208 at a second future time (e.g., at $T_3$, a time after $T_2$). In this example, as the vehicle 204 continues to traverse the environment along its trajectory 206, the prediction component of the vehicle 204 has determined an updated predicted location 218 of the dynamic object 208 in the predicted environment 216 at $T_3$. As shown in this cases, the updated predicted location 218 of the dynamic object 208 indicates a possible overlap with the predicted location of the vehicle 204 at $T_3$. In some cases, the vehicle safety system of the vehicle 204 may determine a risk of a potential collision associated with the dynamic object 208, over a number of future predicted driving environments (e.g., over the next 2 seconds, 5 seconds, etc.). After identifying a risk of a potential collision, the vehicle safety system may compare the potential collision risk to a risk threshold to determine whether or not to trigger the functionality of the vehicle safety to determine and implement a vehicle safety maneuver. As noted above, a vehicle safety maneuver may correspond to the selection of the current trajectory of the vehicle 204, or to the selection of one or more contingent trajectories generated by the vehicle safety system.

As described above, determining and evaluating a potential collision risk may be based on detecting a time-space overlap between regions (e.g., bounding boxes or corridors) at a number of future predicted driving environments. Additionally or alternatively, the vehicle 204 may generate one or more predicted trajectories for the dynamic object 208, and may determine discretized probability distributions based on the predicted trajectories. To evaluate the likelihood of a potential collision, the vehicle 204 may generate a grid 220 of aggregated prediction probabilities based on the current trajectory of the vehicle 204 and the predicted trajectories for the dynamic object 208. In this example, merged maps 222, 224, and 226 may represent aggregated prediction probabilities respectively at the initial time $T_1$, the second time at $T_2$, and the third time $T_3$. Based on the analysis of the merged maps 222, 224, and 226 for different future times, the vehicle 204 may predict a likelihood of a potential collision, with an associated confidence score, at one or more of the future times. For instance, at a particular point in an aggregated prediction probability grid 220, an aggregated prediction probability greater than a threshold value (e.g., 50%, 60%, . . . , 90%, etc.) may indicate a likelihood of a potential collision, which may cause the vehicle safety system to determine safety maneuver in response to the potential collision.

Figure 3:
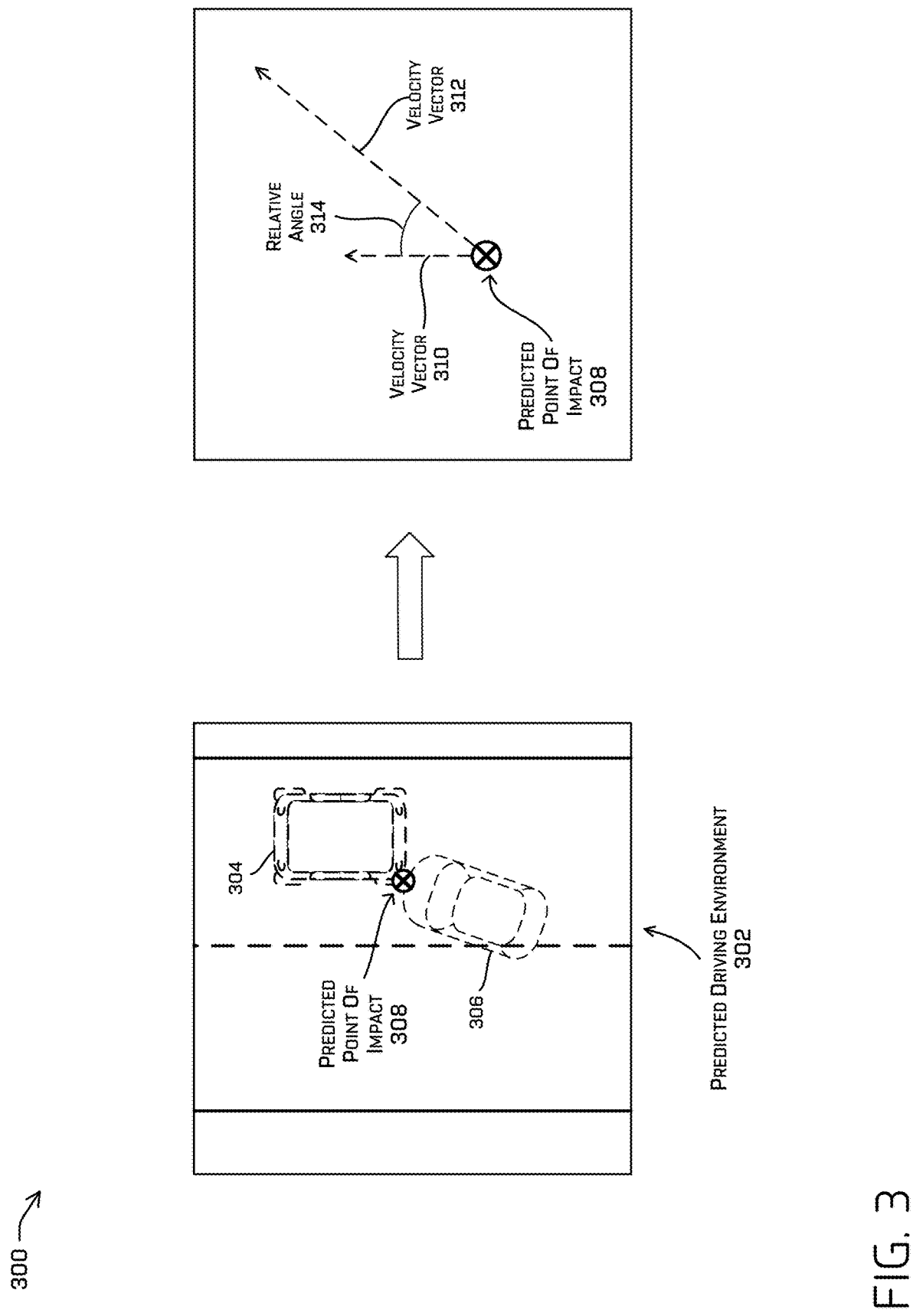
FIG. 3 illustrates an example of a potential collision and velocity vectors associated with an autonomous vehicle and a dynamic object, in accordance with one or more implementations of the disclosure.

FIG. 3 shows a diagram 300 illustrating a potential collision within a predicted driving environment 302. As shown in this example, the predicted driving environment 302 includes a vehicle 304 (e.g., an autonomous or semi-autonomous vehicle) and a dynamic object 306 (e.g., another vehicle). The predicted driving environment 302 may represent the same predicted environment 216 depicted in FIG. 2, in which a potential collision is predicted between the autonomous vehicle 304 and the dynamic object 306, based on the respective trajectories of the vehicles. Also shown in FIG. 3 is the predicted point of impact 308 of the potential collision. In this example, the collision is rear-impact collision for the vehicle 304, and the predicted point of impact 308 is near the left-rear corner of the vehicle 304.

In the right portion of diagram 300, the predicted point of impact 308 is shown again, along with the predicted velocity vectors for both vehicles. Velocity vector 310 represents the predicted velocity vector for the vehicle 304 at the future time and/or location of the potential collision, and the velocity vector 312 represents the predicted velocity vector for the dynamic object 306. As noted above, velocity vector 310 and velocity vector 312 may define the direction of travel and the speed for its respective vehicle. However, in various other examples, velocity vectors may include alternative or additional data components, including but not limited to longitudinal acceleration, lateral (or angular) velocity, lateral acceleration, the pose of the object, etc.

In some examples, the vehicle safety system of the autonomous vehicle 304 may use the predicted velocity vectors 310 and 312 to determine various characteristics associated with the potential collision. For instance, the vehicle safety system may compare the predicted velocity vectors 310 and 312 to determine the predicted relative angle and/or the predicted relative speed between the autonomous vehicle 304 and the dynamic object 306 at the time of the potential collision. As shown in this example, relative angle 314 represents the predicted relative angle between the autonomous vehicle 304 and the dynamic object 306 for the potential collision. The predicted relative velocity may be determined based on the difference between the predicted speeds (e.g., represented by the magnitudes of the vectors) of the autonomous vehicle 304 and the dynamic object 306.

The determine accurate characteristics associated with the potential collision, the velocity vectors 310 and 312 may be to predicted velocity vectors, that is, predictions of the velocity vectors for the vehicles at the future time of the potential collision. In some cases, to determine the predicted velocity vectors for the future time of the potential collision, the vehicle safety system may use the same velocity vectors last observed for the autonomous vehicle 304 and the dynamic object 306. In such cases, the determination of the predicted velocity vectors may assume that the vehicles continue to travel at the same speed and in the same direction until the time of the potential collision. In other examples, the vehicle safety system may assume that that the vehicles continue to travel at the same rate of acceleration, and/or at the same steering rate, between the current time and the time of the potential collision.

Additionally or alternatively, the vehicle safety system may determine predicted velocity vectors for the autonomous vehicle 304 and the dynamic object 306 based on the trajectories determined for the respective objects. For instance, for the autonomous vehicle 304 the planner trajectory (e.g., including intended turns, intended changes in velocity or acceleration, etc.) may be provided to the vehicle safety system by the planning component of the vehicle 304. For the dynamic object 306, one or more possible trajectories may be determined by the prediction components and/or vehicle safety system of the vehicle 304. For instance, a prediction component of the vehicle 304 may determine one or more possible trajectories of the dynamic object 306, by projecting the observed vehicle speed, acceleration, and/or steering rate of the dynamic object 306 into a future trajectory, and then modifying the trajectory based on a probabilistic analysis of the driving environment (e.g., map data, road signs and markings, other objects in the environment, etc.).

Figure 4:
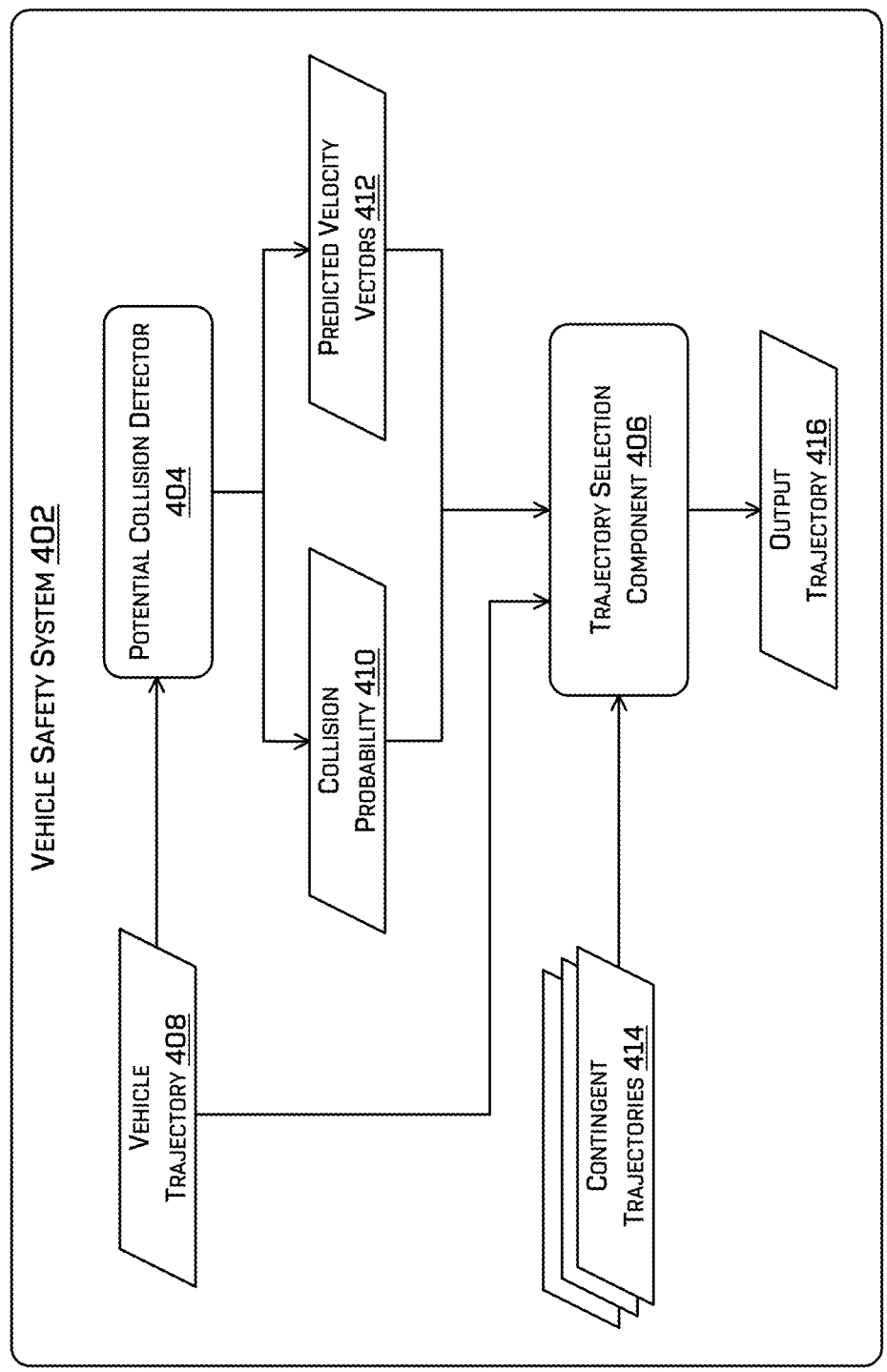
FIG. 4 illustrates example components of a vehicle safety system configured to determine potential collisions and determine trajectories for the autonomous vehicle, in accordance with one or more implementations of the disclosure.

FIG. 4 shows an example system 400 depicting certain components within a vehicle safety system 402. In some implementations, the vehicle safety system 402 may be similar or identical to the vehicle safety system 102 described above in FIG. 1. In this example, the vehicle safety system 402 includes a potential collision detector 404 and a trajectory selection component 406, which may be similar or identical to the collision detection component 104 and a trajectory selection component 106 described above in FIG. 1. The potential collision detector 404 may use various techniques, including but not limited to those described above, to determine an object trajectory (or multiple possible object trajectories) for the dynamic objects within the environment of the autonomous vehicle, and compare the object trajectories to the current trajectory of the autonomous vehicle in time and space and to determine a potential collision at a future time. After a potential collision has been determined by the potential collision detector 404, the trajectory selection component 406 may determine a vehicle safety maneuver for the autonomous vehicle to perform. The vehicle safety maneuver may be determined based on the predicted velocity vectors associated with the autonomous vehicle and/or dynamic object, along with additional characteristics of the potential collision.

In some examples, the potential collision detector 404 may receive a vehicle trajectory 408 from a planning component of the autonomous vehicle (e.g., from a primary compute unit). The vehicle trajectory 408 may correspond to a current trajectory being followed by the autonomous vehicle, determined based on the intended route or destination of the autonomous vehicle. As noted above, in some examples the vehicle trajectory 408 may be generated by a primary vehicle navigation system of the autonomous vehicle, which operates on a separate and independent computing infrastructure from the vehicle safety system 402.

In addition to the vehicle trajectory 408, the vehicle safety system 402 also may receive and analyze sensor data captured by the sensors of the autonomous vehicle. As shown in this example, the potential collision detector 404 may use the sensor data to detect, evaluate, classify, and track dynamic objects within the environment. The potential collision detector 404 may determine and compare trajectories for the dynamic objects in the environment with the vehicle trajectory 408, to identify a potential future collision between a dynamic object and the autonomous vehicle. As shown in this example, in response to detecting a potential collision, the potential collision detector 404 may output a collision probability 410 (e.g., collision likelihood or confidence score, etc.) and the predicted velocity vectors 412 for the vehicles/objects associated with the potential collision.

The trajectory selection component 406 may receive the collision probability 410 and/or predicted velocity vectors 412, and use these data to determine one or more vehicle safety maneuvers for the autonomous vehicle to perform responsive to the potential collision. To determine the vehicle safety maneuvers for the autonomous vehicle, the trajectory selection component 406 may use any of the techniques described herein, including but not limited to comparing the predicted velocity vectors 412 for the autonomous vehicle and the dynamic object to determine a relative collision angle and relative collision velocity for the potential collision. The trajectory selection component 406 also may use the trajectories of the objects to determine a potential point of impact of the potential collision on the autonomous vehicle. Additionally or alternatively, the trajectory selection component 406 may determine various other characteristics of the potential collision based on the object attributes, trajectories, predicted velocity vectors 412, etc. For instance, the trajectory selection component 406 may use the collision probability 410, velocity vectors 412, potential point of impact, etc. to determine the likely severity of the potential collision (e.g., a risk score for potential vehicle damage or passenger injury, etc.). In some cases, the trajectory selection component 406 may determine and use the number of passengers in the autonomous vehicle, and/or the positions of the passengers within the cabin of the vehicle, as well as the estimated size, shape, and/or type of the dynamic object, the road conditions, the weather conditions, the traffic conditions, and/or the presence of other nearby objects, to evaluate the potential collision for determining a vehicle safety maneuver.

Any or all of these additional potential collision characteristics may be included within the mappings (individually or in addition to the velocity vectors) to determine a contingent trajectory. As an example, a relative angle and relative velocity between the autonomous vehicle and an object may be mapped to a trajectory (e.g., a contingent braking trajectory) when the autonomous vehicle is carrying passengers, but may be mapped to a different trajectory (e.g., the current forward-moving trajectory) when the autonomous vehicle is not carrying passengers. As another example, for a particular a relative angle and relative velocity, when a passenger in the autonomous vehicle is sitting a particular seat and facing forward, then the trajectory selection component 406 may select a first trajectory (e.g., a contingent braking trajectory). In contrast, when the passenger is sitting a different seat and/or facing a different direction in the vehicle, then the trajectory selection component 406 may select a different trajectory (e.g., a contingent steering/braking trajectory). The trajectory selection component 406 may use similar mappings for pairs of velocity vectors (and/or pairs of relative angles and/or velocities) in combination with other potential collision characteristics, such as potential points of impact, vehicle speed, road conditions, weather conditions, traffic conditions, and/or the presence of other nearby objects, etc.

In this example, the vehicle safety maneuver determined by the trajectory selection component 406 may correspond to a selection of a trajectory to be implemented by the autonomous vehicle. The trajectory selected by the trajectory selection component 406 may be the vehicle trajectory 408 generated by the planning component, or may be one of the contingent trajectories 414 generated by the vehicle safety system 402. As discussed above, the vehicle safety system 402 may generate one or multiple different contingent trajectories, which may be generated, stored, and validated prior to determining the potential collision. In some cases, the vehicle safety system 402 may generate multiple contingent trajectories in advance that are to be selected for different ranges of relative velocities and/or relative angles when a potential collision is detected. As described above, the trajectory selection component 406 may use mappings between values/ranges of the potential collision characteristics and trajectories to determine which trajectory to select. Additionally or alternatively, the trajectory selection component 406 may use rules, trained models and/or other techniques to determine an output trajectory 416. After determining the output trajectory 416, the vehicle safety system 402 may implement the output trajectory 416 by transmitting commands to the various drive system components of the autonomous vehicle 120.

Figure 5A:
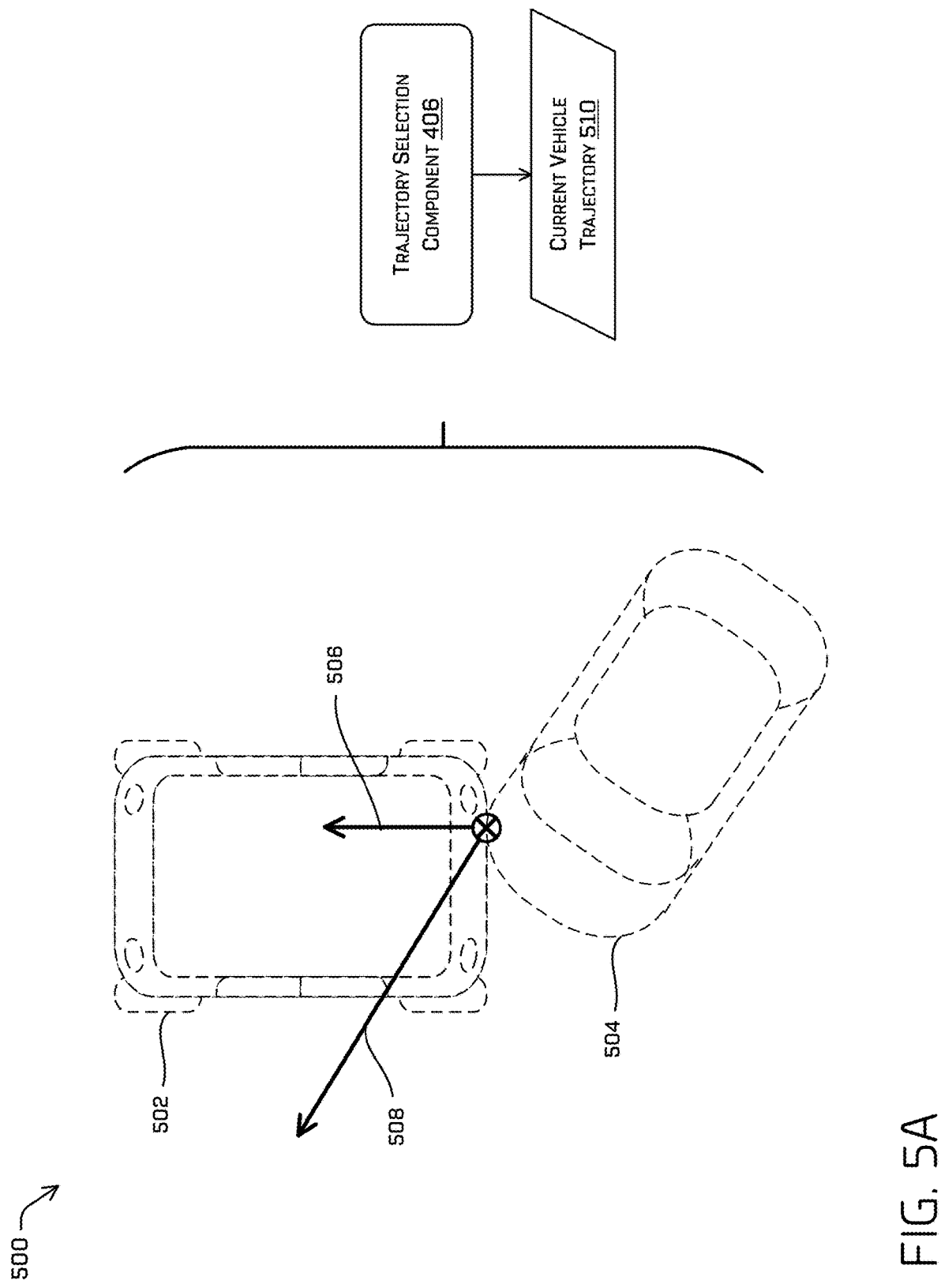
FIGS. 5A-5C illustrate examples of potential collisions and corresponding trajectory selections, in accordance with one or more implementations of the disclosure.
Figure 5B:
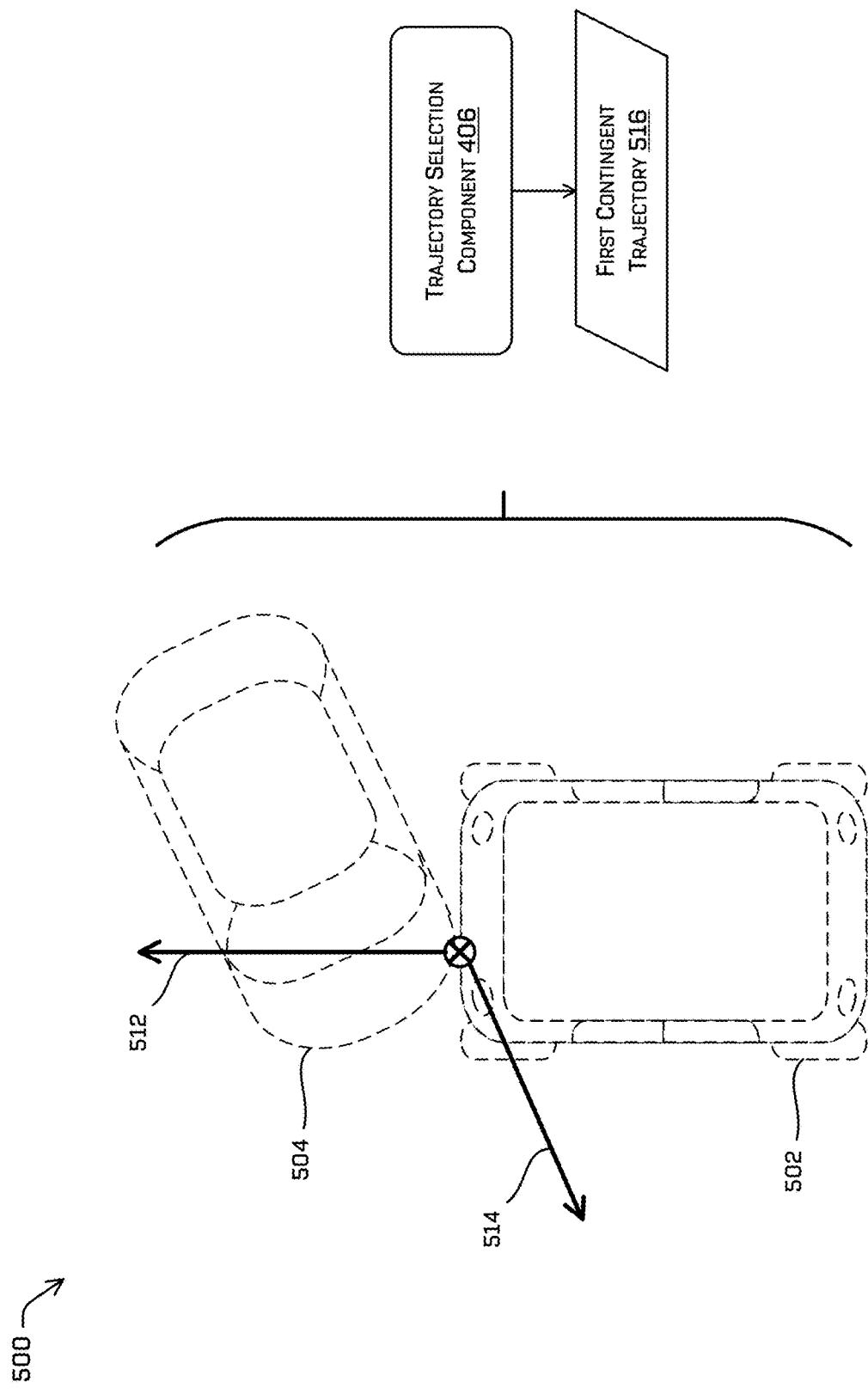
Figure 5C:
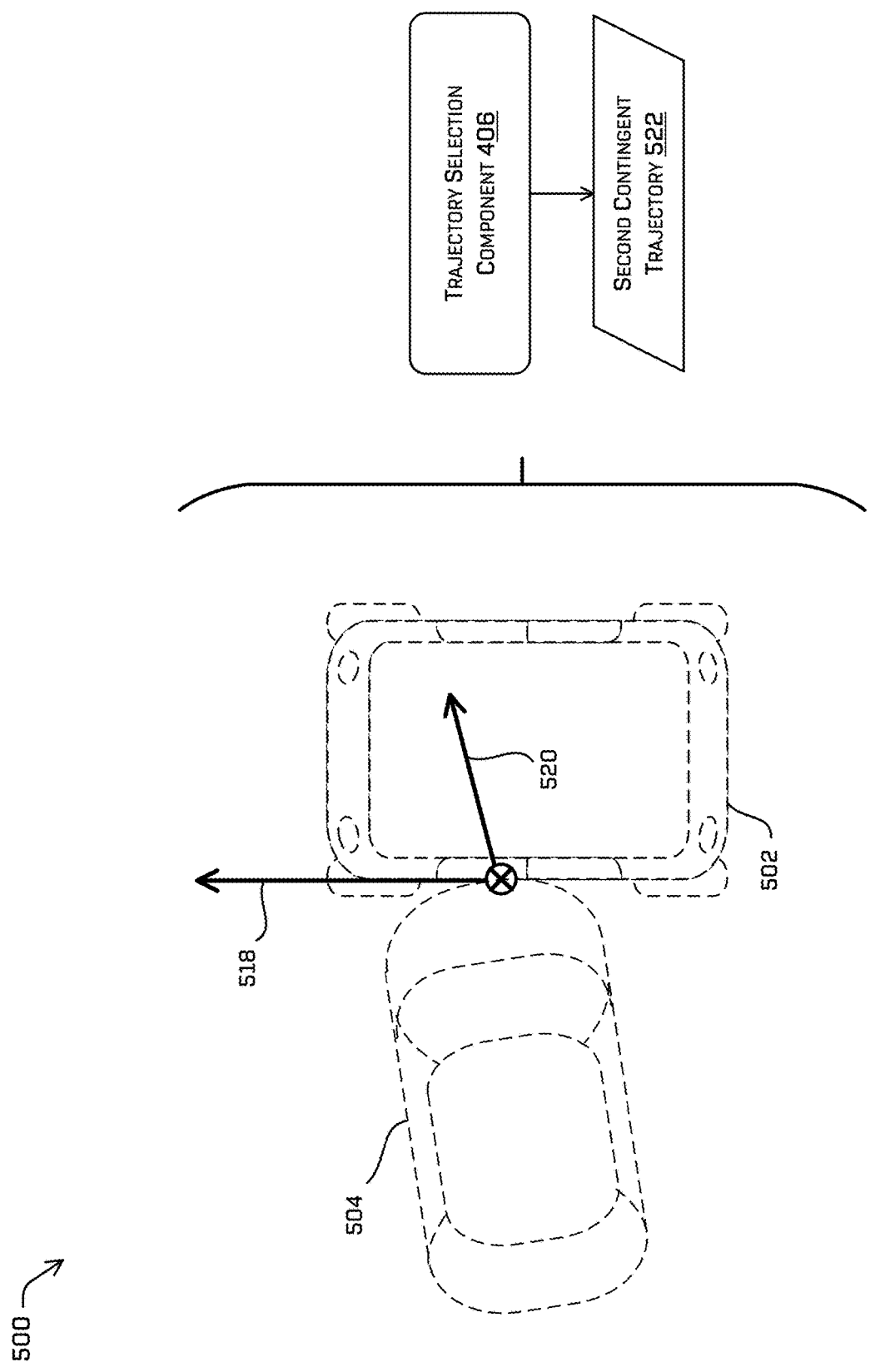

FIGS. 5A-5C show three different examples of potential collisions between an autonomous vehicle 502 and a dynamic object 504 in an environment, along with the corresponding vehicle safety maneuvers determined by the trajectory selection component 406. As shown in these examples, the autonomous vehicle 502 may include a vehicle safety system (e.g., vehicle safety system 402) configured to detect potential collisions within the environment, determine predicted velocity vectors and/or other potential collisions characteristics, and to determine a vehicle safety maneuver using a trajectory selection component 406.

In FIG. 5A, the vehicle safety system of the autonomous vehicle 502 has detected a potential rear-impact collision by the dynamic object 504. Based on the predicted velocity vectors 506 and 508, the dynamic object 504 may potentially strike the rear of the autonomous vehicle 502 at approximately a 45-degree angle, while the dynamic object 504 is moving slightly faster than the autonomous vehicle 502. Based on the predicted velocity vectors 506 and 508, and/or other potential collision characteristics (e.g., the point of impact, the current driving speed, the road and traffic conditions, the presence other nearby objects, estimated momentum of the object and of the vehicle (which may be based at least in part on a detected size of the object), etc.), the trajectory selection component 406 has determined that the autonomous vehicle 502 is to remain on its current trajectory 510, which in this case is a straight-line forward moving trajectory. Additionally or alternatively, trajectory selection component 406 may determine and execute a modification to a current trajectory 510, for instance, by slowing down or speeding up along the same current trajectory 510.

In FIG. 5B, the vehicle safety system of the autonomous vehicle 502 has detected a potential front-impact collision by the dynamic object 504. Based on the predicted velocity vectors 512 and 514, the dynamic object 504 may potentially strike the front of the autonomous vehicle 502 at a relatively glancing angle, while the autonomous vehicle 502 and the dynamic object 504 are moving at approximately the same speed. Based on the predicted velocity vectors 512 and 514, and/or other potential collision characteristics, the trajectory selection component 406 has determined that the autonomous vehicle 502 is to implement a first contingent trajectory 516, which in this case may correspond to an immediate braking trajectory.

In FIG. 5C, the vehicle safety system of the autonomous vehicle 502 has detected a potential side-impact collision by the dynamic object 504. Based on the predicted velocity vectors 518 and 520, the dynamic object 504 may potentially strike the driver side of the autonomous vehicle 502 at an almost right angle, while the dynamic object 504 is moving slower than the autonomous vehicle 502. Based on the predicted velocity vectors 512 and 514, and/or other potential collision characteristics, the trajectory selection component 406 has determined that the autonomous vehicle 502 is to implement a second contingent trajectory 522, which in this case may correspond to a braking and/or right steering trajectory.

Figure 6:
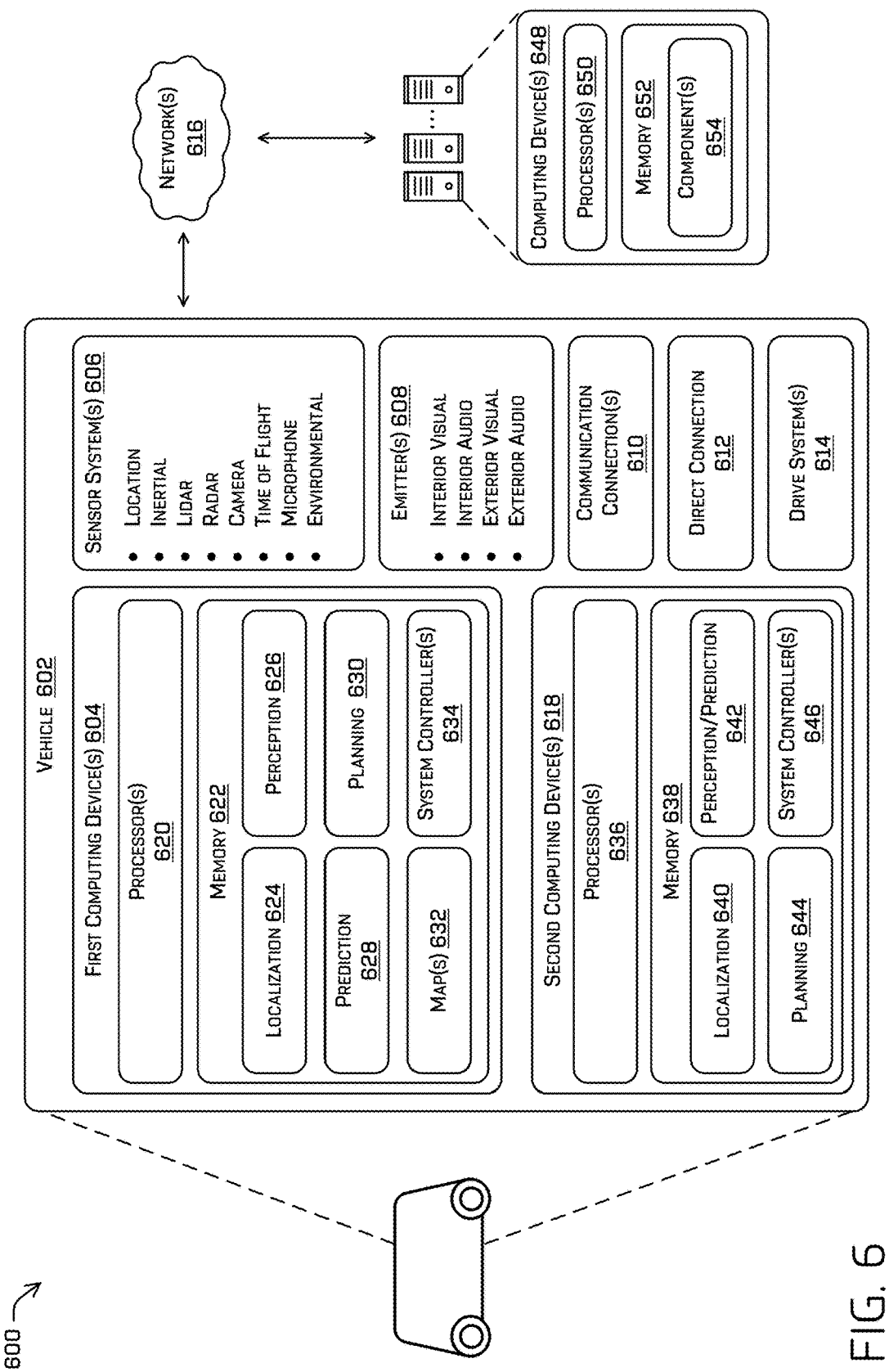
FIG. 6 is a block diagram depicting of an example system for implementing the techniques described herein.

FIG. 6 depicts a block diagram of an example system 600 for implementing various techniques described herein. The system 600 can include a vehicle 602, which can correspond to an autonomous or semi-autonomous vehicle configured to perform various techniques described herein for generating and validating vehicle trajectories, and determining a vehicle trajectory based on an output of a state model. As shown in this example, vehicle 602 may include components configured to generate multiple possible trajectories, validate the trajectories, receive and analyze status data from vehicle components, and determine (or select) an output trajectory based on the output of a state model. The example vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may or may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 can include one or more first computing devices 604, one or more sensor systems 606, one or more emitters 608, one or more communication connections 610 (also referred to as communication devices and/or modems), at least one direct connection 612 (e.g., for physically coupling with the vehicle 602 to exchange data and/or to provide power), and one or more drive systems 614. The one or more sensor systems 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of any number of these and/or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the first computing device(s) 604.

The vehicle 602 can also include emitter(s) 608 for emitting light and/or sound. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include communication connection(s) 610 that enable communication between the vehicle 602 and one or more other local or remote computing device(s) (e.g., a remote teleoperation computing device) or remote services. For instance, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, etc.).

The communications connection(s) 610 can include physical and/or logical interfaces for connecting the first computing device(s) 604 to another computing device or one or more external networks 616 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include the sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more components to perform various functionalities of the drive system(s) 614. Furthermore, the drive system(s) 614 also include one or more communication connection(s) that enable communication by the respective drive system with one or more other local or remote computing device(s).

As shown in this example, the vehicle 602 can include one or more second computing devices 618 to provide redundancy, error checking, and/or validation of determinations and/or commands determined by the first computing device(s) 604. For instance, the second computing devices 618 may implement a vehicle safety system, such as vehicle safety system 102 and/or vehicle safety system 402, which be provide a secondary or backup system to provide redundancy, error checking, and/or validation of the primary navigation systems of the vehicle 602.

By way of example, the first computing device(s) 604 may be considered to be a primary system, while the second computing device(s) 618 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of the sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from any number of the sensors, data from the same number of sensors as the primary system, etc.

The secondary system may implement any of the techniques of FIGS. 1-5C and 7, as described herein. For example, the secondary system may determine one or more safety areas utilized to control the vehicle. The secondary system may be a redundant backup system.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 604 can include one or more processors 620 and memory 622 communicatively coupled with the one or more processors 620. In the illustrated example, the memory 622 of the first computing device(s) 604 stores a localization component 624, a perception component 626, a prediction component 628, a planning component 630, a maps component 632, and one or more system controllers 634. Though depicted as residing in the memory 622 for illustrative purposes, it is contemplated that the localization component 624, the perception component 626, the prediction component 628, the planning component 630, the maps component 632, and the one or more system controllers 634 can additionally, or alternatively, be accessible to the first computing device(s) 604 (e.g., stored in a different component of vehicle 602 and/or be accessible to the vehicle 602 (e.g., stored remotely).

In memory 622 of the first computing device 604, the localization component 624 can include functionality to receive data from the sensor system(s) 606 to determine a position of the vehicle 602. For example, the localization component 624 can include and/or request/receive a three-dimensional map of an environment and can continuously determine a location of the autonomous vehicle within the map. In some instances, the localization component 624 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 624 can provide data to various components of the vehicle 602 to determine an initial position of an autonomous vehicle for generating a trajectory, as discussed herein.

The perception component 626 can include functionality to perform object detection, segmentation, and/or classification. In some examples, the perception component 626 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional or alternative examples, the perception component 626 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 626 can use perception algorithms to determine a perception based bounding box associated with an object in the environment based on sensor data. For example, the perception component 626 can receive image data and classify the image data to determine that an object is represented in the image data. Then, using detection algorithms, the perception component 626 can generate a two-dimensional bounding box and/or a perception based three-dimensional bounding box associated with the object. The perception component 626 can further generate a three-dimensional bounding box associated with the object. As discussed above, the three-dimensional bounding box can provide additional information such as a location, orientation, pose, and/or size (e.g., length, width, height, etc.) associated with the object.

The perception component 626 can include functionality to store perception data generated by the perception component 626. In some instances, the perception component 626 can determine a track corresponding to an object that has been classified as an object type. For purposes of illustration only, the perception component 626, using sensor system(s) 606 can capture one or more images of an environment. The sensor system(s) 606 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 602. Fused perception data can include a fusion or other combination of sensor data from sensor system(s) 606, such as image sensors, lidar sensors, radar sensors, time of flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 628 can generate one or more probability maps representing prediction probabilities of possible locations of one or more objects in an environment. For example, the prediction component 628 can generate one or more probability maps for vehicles, pedestrians, animals, and the like within a threshold distance from the vehicle 602. In some instances, the prediction component 628 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 630 can determine a path for the vehicle 602 to follow to traverse through an environment. For example, the planning component 630 can determine various routes and paths and various levels of detail. In some instances, the planning component 630 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 630 can generate an instruction for guiding the autonomous vehicle along at least a portion of the route from the first location to the second location. In at least one example, the planning component 630 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 630 can alternatively, or additionally, use data from the perception component 626 and/or the prediction component 628 to determine a path for the vehicle 602 to follow to traverse through an environment. For example, the planning component 630 can receive data from the perception component 626 and/or the prediction component 628 regarding objects associated with an environment. Using this data, the planning component 630 can determine a route to travel from a first location (e.g., a current location) to a second location (e.g., a target location) to avoid objects in an environment. In at least some examples, such a planning component 630 may determine there is no such collision free path and, in turn, provide a path which brings vehicle 602 to a safe stop avoiding all collisions and/or otherwise mitigating damage.

The memory 622 can further include one or more maps 632 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 632 can include at least one map (e.g., images and/or a mesh). In some examples, the vehicle 602 can be controlled based at least in part on the map(s) 632. That is, the map(s) 632 can be used in connection with the localization component 624, the perception component 626, the prediction component 628, and/or the planning component 630 to determine a location of the vehicle 602, identify objects in an environment, generate prediction probabilit(ies) associated with objects and/or the vehicle 602, and/or generate routes and/or trajectories to navigate within an environment.

In some examples, the one or more maps 632 can be stored on a remote computing device(s) (such as the computing device(s) 648) accessible via network(s) 616. In some examples, multiple maps 632 can be stored based on, for example, a characteristic (e.g., type of entity, time of day, day of week, season of the year, etc.). Storing multiple maps 632 can have similar memory requirements but can increase the speed at which data in a map can be accessed.

In at least one example, the first computing device(s) 604 can include one or more system controllers 634, which can be configured to control steering, propulsion, braking, safety, emitters, communication, and other systems of the vehicle 602. These system controller(s) 634 can communicate with and/or control corresponding systems of the drive system(s) 614 and/or other components of the vehicle 602, which may be configured to operate in accordance with a path provided from the planning component 630.

The second computing device(s) 618 can comprise one or more processors 636 and memory 638 including components to verify and/or control aspects of the vehicle 602, as discussed herein. In at least one instance, the one or more processors 636 can be similar to the processor(s) 620 and the memory 638 can be similar to the memory 622. However, in some examples, the processor(s) 636 and the memory 638 may comprise different hardware than the processor(s) 620 and the memory 622 for additional redundancy.

In some examples, the memory 638 can comprise a localization component 640, a perception/prediction component 642, a planning component 644, and one or more system controllers 646. Additionally, any one or more of the localization component 640, the perception/prediction component 642, the planning component 644 might not be implemented within the second computing device 618. For instance, a vehicle safety system may be implemented within the second computing device 618, separately and independent from the primary vehicle systems within the first computing device 604, and may receive the outputs (e.g., the detected objects and attributes, the current vehicle trajectory, the trajectories of detected objects, the velocity vectors, the localization data, etc.) from the components within the first computing device 604 (e.g., the localization component 624, the perception component 626, the prediction component 628, the planning component 630, etc.).

In some examples, the localization component 640 may receive sensor data from the sensor(s) 606 to determine one or more of a position and/or orientation (together a pose) of the autonomous vehicle 602. Here, the position and/or orientation may be relative to point(s) and/or object(s) in an environment in which the autonomous vehicle 602 is located. In examples, the orientation may include an indication of a yaw, roll, and/or pitch of the autonomous vehicle 602 relative to a reference plane and/or relative to point(s) and/or object(s). In examples, the localization component 640 may perform less processing than the localization component 624 of the first computing device(s) 604 (e.g., higher-level localization). For instance, the localization component 640 may not determine a pose of the autonomous vehicle 602 relative to a map, but merely determine a pose of the autonomous vehicle 602 relative to objects and/or surfaces that are detected around the autonomous vehicle 602 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 642 can include functionality to detect, identify, classify, and/or track object(s) represented in sensor data. For example, the perception/prediction component 642 can perform the clustering operations and operations to estimate or determine a height associated with objects, as discussed herein.

In some examples, the perception/prediction component 642 may comprise an M-estimator, but may lack an object classifier such as, for example, a neural network, decision tree, and/or the like for classifying objects. In additional or alternate examples, the perception/prediction component 642 may comprise an ML model of any type, configured to disambiguate classifications of objects. By contrast, the perception component 626 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 642 (and/or 626) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 642 may also process the input data to determine one or more predicted trajectories for an object. For example, based on a current position of an object and a velocity of the object over a period of a few seconds, the perception/prediction component 642 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 644 can include functionality to receive a trajectory from the planning component 630 to validate that the trajectory is free of collisions and/or is within safety margins. In some examples, the planning component 644 can generate a safe stop trajectory (e.g., a trajectory to stop the vehicle 602 with a "comfortable" deacceleration (e.g., less than maximum deceleration)) and in some examples the planning component 644 can generate an emergency stop trajectory (e.g., maximum deceleration with or without steering inputs).

In some examples, the system controller(s) 646 can include functionality to control safety critical components (e.g., steering, braking, motors, etc.) of the vehicle. In this manner, the second computing device(s) 618 can provide redundancy and/or an additional hardware and software layer for vehicle safety.

The vehicle 602 can connect to computing device(s) 648 via the network 616 and can include one or more processors 650 and memory 652 communicatively coupled with the one or more processors 650. In at least one instance, the one or more processors 650 can be similar to the processor(s) 620 and the memory 652 can be similar to the memory 622. In the illustrated example, the memory 652 of the computing device(s) 648 stores a component(s) 654, which may correspond to any of the components discussed herein.

The processor(s) 620, 636, and/or 650 can be any suitable processor capable of executing instructions to process data and perform operations as described herein. By way of example and not limitation, the processor(s) 620, 636, and/or 650 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 622, 638, and/or 652 are examples of non-transitory computer-readable media. The memory 622, 638, and/or 652 can store an operating system and one or more software applications, instructions, programs, and/or data to implement the methods described herein and the functions attributed to the various systems. In various implementations, the memory 622, 638, and/or 652 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 622, 638, and/or 652 can be implemented as a neural network. In some examples, the components in the memory 622, 638, and/or 652 may not include machine learning algorithms (or may include simplified or verifiable machine learned algorithms) to reduce complexity and to be verified and/or certified from a safety standpoint.

As described herein, an exemplary neural network is a biologically inspired algorithm which passes input data through a series of connected layers to produce an output. Any number of the layers in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 7:
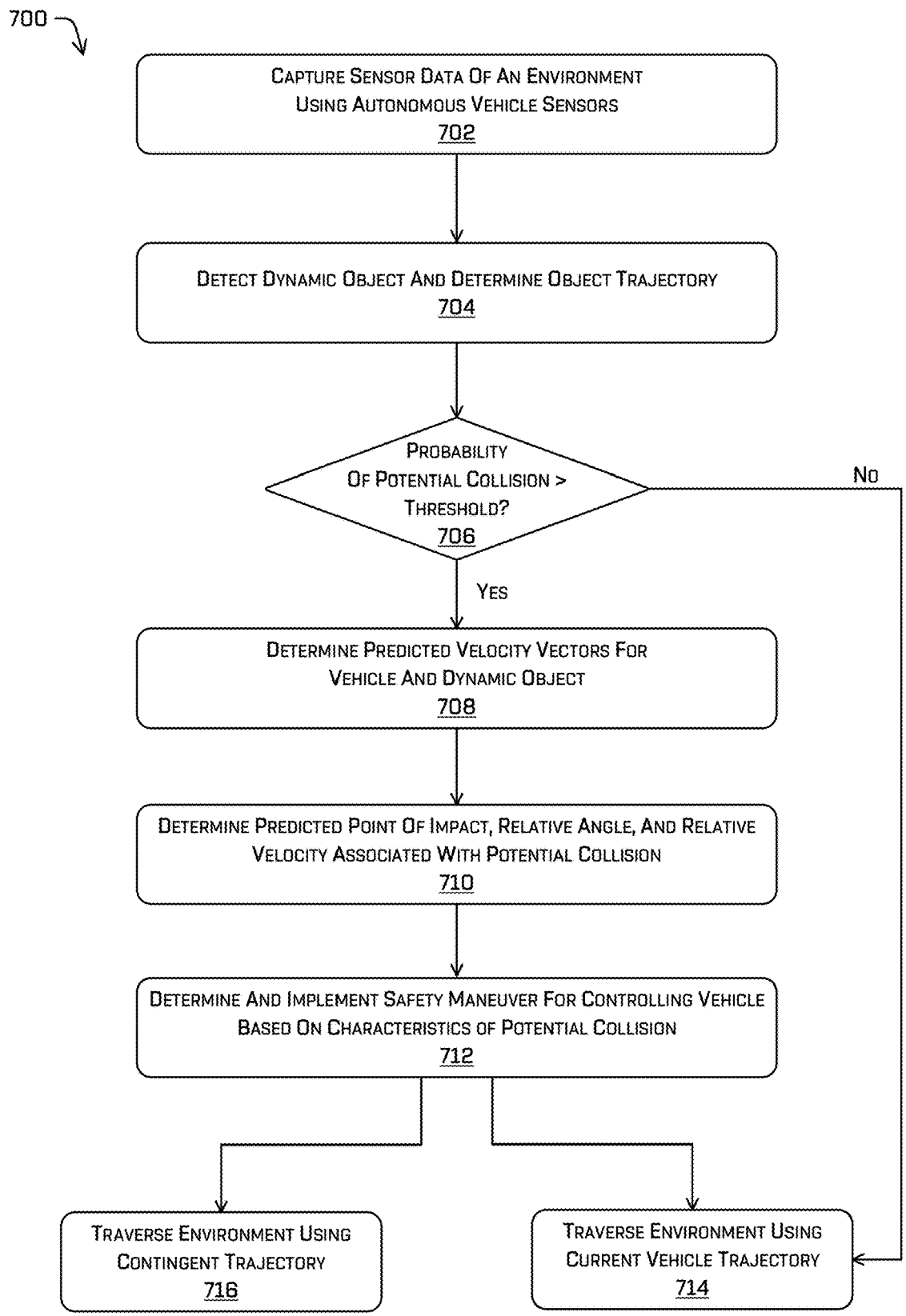
FIG. 7 is a flow diagram illustrating an example process of determining a trajectory for an autonomous vehicle, based on a probability of a potential collision and the predicted velocity vectors of the autonomous vehicle and dynamic object, in accordance with one or more implementations of the disclosure.

FIG. 7 is a flow diagram illustrating an example process 700 of determining a trajectory for an autonomous vehicle, based on a probability of a potential collision and the predicted velocity vectors associated with the potential collision. As described below, process 700 may be performed by an autonomous vehicle including a vehicle safety system configured to determine vehicle safety maneuvers and/or determine particular vehicle trajectories in responses to potential collisions. For instance, the operations of process 700 may be performed by a vehicle safety system 402 including a potential collision detector 404 and a trajectory selection component 406.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the autonomous vehicle may capture sensor data of an environment using one or more sensors of the autonomous vehicle. As described above, the autonomous vehicle may include a number of sensors configured to capture sensor data within the environment (e.g., image data, radar data, lidar data, sonar data, etc.). The various navigation components of the autonomous vehicle, such as the perception component(s), prediction components(s), and/or the planning component(s) may detect/identify objects, determine bounding boxes, perform instance and semantic segmentation, perform object classification, and the like.

At operation 704, the autonomous vehicle may detect a dynamic object within environment, and determine one or more predicted trajectories for the dynamic object. In some examples, the planning component of an autonomous vehicle may actively implement a planner trajectory for the vehicle, by transmitting commands to the drive system components of the vehicle. The planning component may provide the current trajectory of the autonomous vehicle to the vehicle safety system. In contrast, for determining trajectories for the dynamic objects in the environment, the autonomous vehicle may use a prediction component to determine one or more possible trajectories based on an analysis of the captured sensor data associated with the dynamic object. For instance, a prediction component may project the observed vehicle speed, acceleration, and/or steering rate of the dynamic object into a future trajectory, and then may modify the trajectory based on a probabilistic analysis of the driving environment (e.g., map data, road signs and markings, other objects in the environment, etc.). In various examples, the predicted trajectories for the dynamic object and the autonomous vehicle may be determined by the vehicle safety system, and/or by a primary vehicle navigation system implemented separately from the vehicle safety system.

At operation 706, the vehicle safety system of the autonomous vehicle may determine a likelihood of a potential collision between the autonomous vehicle and another dynamic object. In some examples, the potential collision detector 404 may evaluate the trajectories of the autonomous vehicle and the dynamic objects in the environment, and may determine a potential collision risk based on a time-space overlap between the trajectories. In some cases, the potential collision detector 404 may determine spatial overlap between bounding boxes and/or corridors in a top-down representation of the environment, at a number of future times. Additionally or alternatively, the potential collision detector 404 may generate one or more predicted trajectories for a dynamic object, and may determine discretized probability distributions based on the predicted trajectories. Then, to evaluate the likelihood of a potential collision in operation 706, the potential collision detector 404 may generate a grid of aggregated prediction probabilities based on the current trajectory of the vehicle and the predicted trajectories for the dynamic object.

When the determined probability (e.g., which may be represented as a likelihood, risk, or confidence score) does not meet or exceed potential collision probability threshold (706: No), then process 700 may proceed to operation 714 where the autonomous vehicle may continue along its current trajectory. In contrast, when the determined probability of a potential collision meets or exceeds the probability threshold (706: Yes), then process 700 may proceed to operations 708-712 to determine a vehicle safety maneuver in response to the potential collision.

At operation 708, the vehicle safety system may determine predicted velocity vectors for the autonomous vehicle and for the dynamic object, associated with the potential collision. The predicted velocity vectors may include the predicted speeds and predicted directions of travel for the autonomous vehicle and the dynamic object. In various examples, the predicted velocity vectors may be determined as last observed velocity data (e.g., speed and orientation) of the autonomous vehicle and the dynamic object. In other examples, the predicted velocity vectors may be extrapolated by the vehicle safety system, based on the observed acceleration and/or steering rates of the autonomous vehicle and the dynamic object, between the observation time and the time of the potential collision.

At operation 710, the vehicle safety system may determine various additional characteristics of the potential collision, based on the trajectories and/or the velocity vectors of the autonomous vehicle and the dynamic object. For instance, the trajectory selection component 406 may determine potential collision characteristics, including but not limited to a predicted point of impact on the autonomous vehicle, a relative angle of impact, and/or a relative velocity between the autonomous vehicle and the dynamic object. Additionally, trajectory selection component 406 also may determine and use the number of passengers in the autonomous vehicle, and/or the positions of the passengers within the cabin of the vehicle, as well as the estimated size, shape, and/or type of the dynamic object, the road conditions, the weather conditions, the traffic conditions, and/or the presence of other nearby objects, to evaluate the potential collision for determining a vehicle safety maneuver.

At operation 712, the vehicle safety system may determine and implement a vehicle safety maneuver for controlling the autonomous vehicle, based at least in part on the predicted velocity vectors determined in operation 708 and/or characteristics of the potential collision determined in operation 710. As described above, determining a vehicle safety maneuver may include selecting a trajectory for the autonomous vehicle to follow. A selected vehicle trajectory may be, for example, the current (e.g., planner) trajectory of the autonomous vehicle, which the autonomous vehicle may traverse in operation 714. Alternatively, the selected trajectory may be a contingent trajectory generated by the vehicle safety system, which the autonomous vehicle may traverse in operation 716.

Example Clauses

A. A system comprising: one or more processors; and one or more non-transitory computer-readable media storing computer-executable instructions that, when executed, cause the system to perform operations comprising: receiving sensor data captured by a sensor associated with an autonomous vehicle within an environment; receiving a trajectory associated with the autonomous vehicle; determining, based at least in part on the trajectory and the sensor data, a likelihood of a potential collision between the autonomous vehicle and a dynamic object proximate the autonomous vehicle; determining, based at least in part on the likelihood of the potential collision meeting or exceeding a threshold, a predicted first velocity vector for the autonomous vehicle and a predicted second velocity vector for the dynamic object, wherein the predicted first velocity vector and the predicted second velocity vector are associated with the potential collision; and determining, based at least in part on the predicted first velocity vector and the predicted second velocity vector, a safety maneuver to use to control the autonomous vehicle from among (i) the trajectory or (ii) a contingent trajectory generated by a safety system of the autonomous vehicle; and controlling the autonomous vehicle to implement the safety maneuver.

B. The system as recited in paragraph A, wherein determining the safety maneuver to use to control the autonomous vehicle comprises: determining, based at least in part on the predicted first velocity vector and the predicted second velocity vector, at least one of: a predicted relative angle between the autonomous vehicle and the dynamic object associated with the potential collision, or a predicted point of impact on the autonomous vehicle, and wherein determining the safety maneuver is further based at least in part on one or more of the predicted relative angle or the predicted point of impact.

C. The system as recited in paragraph A, wherein determining the safety maneuver to use to control the autonomous vehicle comprises: determining, based at least in part on the predicted first velocity vector and the predicted second velocity vector, a predicted relative velocity between the autonomous vehicle and the dynamic object associated with the potential collision, and wherein determining the safety maneuver is further based at least in part on the predicted relative velocity.

D. The system as recited in paragraph A, wherein determining the predicted first velocity vector is based at least in part on the trajectory, and wherein determining the safety maneuver to use to control the autonomous vehicle comprises: determining a predicted third velocity vector for the autonomous vehicle, based at least in part on the contingent trajectory, wherein the predicted third velocity vector is associated with the potential collision.

E. The system as recited in paragraph A, wherein determining the safety maneuver to use to control the autonomous vehicle is further based at least in part on at least one of: an object classification associated with the dynamic object, an estimated size of the dynamic object, a number of passengers being transported by the autonomous vehicle, a position of a passenger within the autonomous vehicle, or an inconsistency between an expected location of a traffic control annotation and an observed location of the traffic control annotation.

F. A method comprising: receiving sensor data captured by a sensor associated with a vehicle; determining a likelihood of a collision between the vehicle and an object within an environment proximate the vehicle; determining, based at least in part on the likelihood of the collision meeting or exceeding a threshold, a predicted first velocity vector for the vehicle and a predicted second velocity vector for the object; determining, based at least in part on the likelihood of the collision, the first predicted velocity vector, and the second predicted velocity vector, a safety maneuver to use to control the vehicle; and controlling the vehicle to implement the safety maneuver.

G. The method of paragraph F, wherein determining the safety maneuver comprises: determining, based at least in part on the predicted first velocity vector and the predicted second velocity vector, at least one of: a predicted relative angle between the vehicle and the object, or a predicted point of impact on the vehicle.

H. The method of paragraph F, wherein determining the safety maneuver comprises: determining, based at least in part on the predicted first velocity vector and the predicted second velocity vector, a predicted relative velocity between the vehicle and the object.

I. The method of paragraph F, further comprising: receiving a trajectory associated with the vehicle from a route planning component of the vehicle; and generating a contingent trajectory for the vehicle, wherein determining the safety maneuver is based at least in part on the predicted first velocity vector and the predicted second velocity vector and comprises at least one of: determining to use the trajectory as the safety maneuver, or determining to use the contingent trajectory as the safety maneuver.

J. The method of paragraph I, wherein: determining the safety maneuver comprises determining to use the contingent trajectory as the safety maneuver, and determining to use the contingent trajectory as the safety maneuver comprises: determining a first contingent trajectory and a second contingent trajectory for the vehicle; and determining, based at least in part on the predicted second velocity vector associated with the object, either the first contingent trajectory or the second contingent trajectory as the contingent trajectory.

K. The method of paragraph I, wherein the predicted first velocity vector is associated with the trajectory, and wherein determining the safety maneuver comprises: determining a predicted third velocity vector associated with the contingent trajectory; and determining, based at least in part on the predicted first velocity vector, the predicted second velocity vector, and the predicted third velocity vector, either the trajectory or the contingent trajectory as the safety maneuver.

L. The method of paragraph I, further comprising: determining a confidence score associated with the collision between the vehicle and the object, wherein determining to use the safety maneuver is further based at least in part on the confidence score.

M. The method of paragraph F, wherein determining the safety maneuver is further based at least in part on at least one of: an object classification associated with the object, a size of the object, a number of passengers being transported by the vehicle, a position of a passenger within the vehicle, or an inconsistency between an expected location of a traffic control annotation and an observed location of the traffic control annotation.

N. The method of paragraph F, wherein the sensor data includes a lidar point cloud associated with the object, and wherein the method further comprises: generating a first rendering of the lidar point cloud at a first resolution; and generating a second rendering of the lidar point cloud at a second resolution, wherein determining the second predicted velocity vector associated with the object is based at least in part on the first rendering and the second rendering.

O. One or more non-transitory computer-readable media storing processor-executable instructions that, when executed by one or more processors, cause the one or more processors to perform operations comprising: receiving sensor data captured by a sensor associated with a vehicle; determining a likelihood of a collision between the vehicle and an object within an environment proximate the vehicle; determining, based at least in part on the likelihood of the collision meeting or exceeding a threshold, a predicted first velocity vector for the vehicle and a predicted second velocity vector for the object; determining, based at least in part on the likelihood of the collision, the first predicted velocity vector, and the second predicted velocity vector, a safety maneuver to use to control the vehicle; and controlling the vehicle to implement the safety maneuver.

P. The one or more non-transitory computer-readable media of paragraph O, wherein determining the safety maneuver comprises: determining, based at least in part on the predicted first velocity vector and the predicted second velocity vector, at least one of: a predicted relative angle between the vehicle and the object, or a predicted point of impact on the vehicle.

Q. The one or more non-transitory computer-readable media of paragraph O, wherein determining the safety maneuver comprises: determining, based at least in part on the predicted first velocity vector and the predicted second velocity vector, a predicted relative velocity between the vehicle and the object.

R. The one or more non-transitory computer-readable media of paragraph O, the operations further comprising: receiving a trajectory associated with the vehicle from a route planning component of the vehicle; and generating a contingent trajectory for the vehicle, wherein determining the safety maneuver is based at least in part on the predicted first velocity vector and the predicted second velocity vector and comprises at least one of: determining to use the trajectory as the safety maneuver, or determining to use the contingent trajectory as the safety maneuver.

S. The one or more non-transitory computer-readable media of paragraph R, wherein: determining the safety maneuver comprises determining to use the contingent trajectory as the safety maneuver, and determining to use the contingent trajectory as the safety maneuver comprises: determining a first contingent trajectory and a second contingent trajectory for the vehicle; and determining, based at least in part on the predicted second velocity vector associated with the object, either the first contingent trajectory or the second contingent trajectory as the contingent trajectory.

T. The one or more non-transitory computer-readable media of paragraph R, wherein the predicted first velocity vector is associated with the trajectory, and wherein determining the safety maneuver comprises: determining a predicted third velocity vector associated with the contingent trajectory; and determining, based at least in part on the predicted first velocity vector, the predicted second velocity vector, and the predicted third velocity vector, either the trajectory or the contingent trajectory as the safety maneuver.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising: one or more processors; and one or more non-transitory computer-readable media storing computer-executable instructions that, when executed, cause the system to perform operations comprising: receiving sensor data captured by a sensor associated with an autonomous vehicle within an environment;
receiving a trajectory and a contingent vehicle trajectory for the autonomous vehicle to follow;
determining, based at least in part on the trajectory and the sensor data, a likelihood of a potential collision between the autonomous vehicle and a dynamic object;
determining, based at least in part on the likelihood of the potential collision meeting or exceeding a threshold, a predicted first velocity vector for the autonomous vehicle and a predicted second velocity vector for the dynamic object; determining, based at least in part on comparing the predicted first velocity vector with the predicted second velocity vector, a first predicted relative angle of impact associated with the potential collision, determining, based at least in part on the contingent vehicle trajectory and the sensor data, an additional likelihood of a second potential collision between the autonomous vehicle and the dynamic object;

determining, based at least in part on the additional likelihood of the second potential collision meeting or exceeding the threshold, a predicted third velocity vector for the autonomous vehicle and a predicted fourth velocity vector for the dynamic object;

determining, based at least in part on comparing the predicted third velocity vector with the predicted fourth velocity vector, a second predicted relative angle of impact associated with the second potential collision;

determining, based at least in part on comparing the first predicted relative angle of impact and the second predicted relative angle of impact and as a determined trajectory, the trajectory or contingent vehicle trajectory;

and controlling the autonomous vehicle by following the determined trajectory.

2. The system as recited in claim 1, wherein determining to control the autonomous vehicle according to the determined trajectory comprises:

determining, based at least in part on the predicted first velocity vector, the predicted second velocity vector, the first predicted relative angle of impact, and the likelihood of the potential collision, to control the autonomous vehicle according to the contingent vehicle trajectory instead of the trajectory.

3. The system as recited in claim 1, wherein determining the likelihood of the potential collision comprises:

determining, based at least in part on the predicted first velocity vector, the predicted second velocity vector, the first predicted relative angle of impact, and the likelihood of the potential collision, to control the autonomous vehicle, the likelihood of the potential collision being indicated by a first point having a first aggregated potential collision prediction probability associated with a current trajectory of the dynamic object, or a second point having a second aggregated potential collision prediction probability associated with a predicted trajectory of the dynamic object.

4. The system as recited in claim 1, wherein determining to control the autonomous vehicle comprises:

determining, based at least in part on the predicted first velocity vector, the predicted second velocity vector, the first predicted relative angle of impact, the likelihood of the potential collision, and a predicted fifth velocity vector for the autonomous vehicle, to control the autonomous vehicle according to the contingent vehicle trajectory, wherein the predicted fifth velocity vector is associated with the potential collision.

5. The system as recited in claim 1, wherein determining to control the autonomous vehicle to implement the determined trajectory is further based at least in part on at least one of:

an object classification associated with the dynamic object, an estimated size of the dynamic object, a number of passengers being transported by the autonomous vehicle, a position of a passenger within the autonomous vehicle, or an inconsistency between an expected location of a traffic control annotation and an observed location of the traffic control annotation.

6. The system of claim 1, the operations further comprising:

determining that the trajectory is mapped to a first set of characteristics and the contingent vehicle trajectory is mapped to a second set of characteristics that is different than the first set of characteristics;

determining, based at least in part on comparing the predicted first velocity vector with the predicted second velocity vector, predicted relative velocity associated with the first potential collision;

determining that the first predicted relative angle of impact and the predicted relative velocity are associated with the second set of characteristics; and determining, based at least in part on the first predicted relative angle of impact and the predicted relative velocity being associated with the second set of characteristics, to follow the contingent vehicle trajectory.

7. A method comprising: receiving sensor data captured by a sensor associated with a vehicle in an environment;

receiving a current trajectory and a contingent trajectory for the vehicle to follow;

determining, based at least in part on a likelihood of a first potential collision meeting or exceeding a threshold, a predicted first velocity vector for the vehicle and a predicted second velocity vector for an object;

determining, based at least in part on comparing the predicted first velocity vector with the predicted second velocity vector, a first predicted relative angle of impact associated with the first potential collision between the vehicle and the object;

determining, based at least in part on an additional likelihood of a second potential collision meeting or exceeding the threshold, a predicted third velocity vector for the vehicle associated with the contingent vehicle trajectory and a predicted fourth velocity vector for the object;

determining, based at least in part on comparing the predicted third velocity vector with the predicted fourth velocity vector, a second predicted relative angle of impact associated with the second potential collision;

determining, based at least in part on comparing the first predicted relative angle of impact and the second predicted relative angle of impact and as a determined trajectory, the current trajectory or contingent vehicle trajectory; and controlling the vehicle to by following the determined trajectory.

8. The method of claim 7, wherein determining to control the vehicle comprises: determining, based at least in part on the predicted first velocity vector, the predicted second velocity vector, the first predicted relative angle of impact, and the likelihood of the first potential collision, to control the vehicle according to the contingent vehicle trajectory instead of the current trajectory for the vehicle to follow.

9. The method of claim 7, wherein determining to control the vehicle comprises: determining, based at least in part on the predicted first velocity vector, the predicted second velocity vector, the first predicted relative angle of impact a predicted relative velocity, and the likelihood of the first potential collision, to control the vehicle according to the current trajectory for the vehicle to follow instead of the contingent vehicle trajectory, the current trajectory being determined without taking into account a probability of a future position of the object, a future velocity of the object, or a future acceleration of the object at individual locations.

10. The method of claim 7, further comprising:
receiving a trajectory associated with the vehicle from a route planning component of the vehicle, the trajectory being generated by the route planning component; and
generating, by a safety component which is a different component than the route planning component, the contingent vehicle trajectory.

11. The method of claim 7, further comprising receiving the current trajectory for the vehicle to follow; determining the contingent vehicle trajectory as a fallback in an event that following the current trajectory is determined to have a probability of resulting in a collision that meets or exceeds the threshold, and determining to control the vehicle according to the contingent vehicle trajectory.

12. The method of claim 7, wherein determining to control the vehicle comprises: determining, based at least in part on the predicted first velocity vector, the predicted second velocity vector, the first predicted relative angle of impact, the likelihood of the first potential collision, and a predicted third velocity vector associated with the contingent vehicle trajectory; and determining, based at least in part on the predicted first velocity vector, the predicted second velocity vector, and the predicted third velocity vector, either the current trajectory for the vehicle to follow or the contingent vehicle trajectory.

13. The method of claim 7, further comprising:
determining a confidence score associated with the first potential collision between the vehicle and the object,
wherein determining to control the vehicle to follow the determined trajectory is further based at least in part on the confidence score.

14. The method of claim 7, wherein determining to control the vehicle to follow the determined trajectory is further based at least in part on at least one of:
an object classification associated with the object,
a size of the object,
a number of passengers being transported by the vehicle,
a position of a passenger within the vehicle, or
an inconsistency between an expected location of a traffic control annotation and an observed location of the traffic control annotation.

15. The method of claim 7, wherein the sensor data includes a lidar point cloud associated with the object, further comprising:
generating a first rendering of the lidar point cloud at a first resolution; and
generating a second rendering of the lidar point cloud at a second resolution,
wherein determining the predicted second velocity vector associated with the object is based at least in part on the first rendering and the second rendering.

16. One or more non-transitory computer-readable media storing processor-executable instructions that, when executed by one or more processors, cause the one or more processors to perform operations comprising:
receiving sensor data captured by a sensor associated with a vehicle in an environment;
receiving a current trajectory and a contingent vehicle trajectory for the vehicle to follow; validating the contingent vehicle trajectory;
determining, based at least in part on a likelihood of a first potential collision meeting or exceeding a threshold, a predicted first velocity vector for the vehicle and a predicted second velocity vector for an object;
determining, based at least in part on comparing the predicted first velocity vector with the predicted second velocity vector, a first predicted relative angle of impact associated with the first potential collision between the vehicle and the object;
determining, based at least in part on an additional likelihood of a second potential collision meeting or exceeding the threshold, a predicted third velocity vector for the vehicle associated with the contingent vehicle trajectory and a predicted fourth velocity vector for the object;
determining, based at least in part on comparing the predicted third velocity vector with the predicted fourth velocity vector, a second predicted relative angle of impact associated with the second potential collision;
determining, based at least in part on comparing the first predicted relative angle of impact and the second predicted relative angle of impact and as a determined trajectory, the current trajectory or contingent vehicle trajectory; and
controlling the vehicle to follow the determined trajectory.

17. The one or more non-transitory computer-readable media of claim 16, wherein determining to control the vehicle comprises: determining, based at least in part on the predicted first velocity vector, the predicted second velocity vector, the predicted relative angle of impact, and the likelihood of the first potential collision to control the vehicle according to the contingent vehicle trajectory instead of the current trajectory for the vehicle to follow.

18. The one or more non-transitory computer-readable media of claim 16, wherein determining to control the vehicle comprises: determining, based at least in part on the predicted first velocity vector, the predicted second velocity vector, the first predicted relative angle of impact, a predicted relative velocity, and the likelihood of the first potential collision, to control the vehicle according to the current trajectory for the vehicle to follow instead of the contingent vehicle trajectory, the current trajectory being determined without taking into account a probability of a future position of the object, a future velocity of the object, or a future acceleration of the object at individual locations.

19. The one or more non-transitory computer-readable media of claim 16, the operations further comprising:
receiving a trajectory associated with the vehicle from a route planning component of the vehicle, the current trajectory being generated by the route planning component; and
generating, by a safety component which is a different component than the route planning component, the contingent vehicle trajectory.

20. The one or more non-transitory computer-readable media of claim 16, the operations further comprising: receiving the current trajectory for the vehicle to follow; determining the contingent vehicle trajectory as a fallback in an event that following the current trajectory is determined to have the likelihood of resulting in collision that meets or exceeds the threshold, and determining to control the vehicle according to the contingent trajectory to implement the safety maneuver.

* * * * *